United States Patent
Morita et al.

(10) Patent No.: US 10,236,521 B2
(45) Date of Patent: Mar. 19, 2019

(54) FUEL CELL SYSTEM

(71) Applicant: Panasonic Intellectual Property Management Co., Ltd., Osaka (JP)

(72) Inventors: Junji Morita, Kyoto (JP); Akinori Yukimasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 628 days.

(21) Appl. No.: 14/937,863

(22) Filed: Nov. 10, 2015

(65) Prior Publication Data

US 2016/0149234 A1 May 26, 2016

(30) Foreign Application Priority Data

Nov. 20, 2014 (JP) ................................. 2014-235728

(51) Int. Cl.
| | | |
|---|---|---|
| *H01M 8/04* | (2016.01) | |
| *H01M 8/04119* | (2016.01) | |
| *H01M 8/0612* | (2016.01) | |
| *H01M 8/04014* | (2016.01) | |
| *H01M 8/04029* | (2016.01) | |
| *H01M 8/0432* | (2016.01) | |
| *H01M 8/04701* | (2016.01) | |
| *H01M 8/04313* | (2016.01) | |
| *H01M 8/04746* | (2016.01) | |
| *H01M 8/04858* | (2016.01) | |

(52) U.S. Cl.
CPC ... *H01M 8/04164* (2013.01); *H01M 8/04014* (2013.01); *H01M 8/04029* (2013.01); *H01M 8/0432* (2013.01); *H01M 8/0435* (2013.01); *H01M 8/04313* (2013.01); *H01M 8/04343* (2013.01); *H01M 8/04358* (2013.01); *H01M 8/04373* (2013.01); *H01M 8/04723* (2013.01); *H01M 8/04753* (2013.01); *H01M 8/04932* (2013.01); *H01M 8/0618* (2013.01)

(58) Field of Classification Search
CPC ......... H01M 8/04164; H01M 8/04343; H01M 8/0435; H01M 8/04358; H01M 8/04313; H01M 8/0432
See application file for complete search history.

(56) References Cited

U.S. PATENT DOCUMENTS

| | | | |
|---|---|---|---|
| 2003/0129465 A1* | 7/2003 | Nakamura | H01M 8/04029 429/410 |
| 2014/0242480 A1* | 8/2014 | Ogawa | H01M 8/04164 429/414 |

FOREIGN PATENT DOCUMENTS

| | | |
|---|---|---|
| EP | 1396897 | 3/2004 |
| JP | 2010-277973 | 12/2010 |
| JP | 2012-038538 | 2/2012 |
| JP | 2013-222577 | 10/2013 |

OTHER PUBLICATIONS

The Extended European Search Report dated Apr. 12, 2016 for the related European Patent Application No. 15193673.9.

* cited by examiner

*Primary Examiner* — Ladan Mohaddes
(74) *Attorney, Agent, or Firm* — McDermott Will & Emery LLP

(57) ABSTRACT

A fuel cell system is provided that can operate continuously and appropriately when a water self-sustaining operation of the fuel cell system is difficult due to environmental conditions and operating conditions, etc. When a first water level corresponding to a water shortage in a condensed water tank is detected using a water level detector, a controller implements a water-saving mode where the output of a fuel cell is decreased regardless of the external power load and the amount of reforming water used is reduced. When it is determined using a cooling determination device during the water-saving mode that the exhaust gas cooling capability in a condenser brought about by a cooling medium is at least a prescribed value, the controller implements a water recovery mode where the output of the fuel cell is increased regardless of the external power load and the amount of condensed water recovered is increased.

8 Claims, 14 Drawing Sheets

FUEL CELL SYSTEM

BACKGROUND

1. Technical Field

The present disclosure relates to a fuel cell system.

2. Description of the Related Art

A fuel cell system is provided with: a reformer that subjects a raw material such as natural gas or LPG to a reform reaction together with water vapor to form a hydrogen-containing fuel gas; and a fuel cell that uses the fuel gas produced by the reformer and oxygen in an oxidant gas to generate power.

The fuel gas and oxidant gas that is not used to generate power by the fuel cell is combusted and becomes exhaust gas, and the heat of the exhaust gas is used for heating the reformer and the fuel cell. In addition, the exhaust gas is cooled by a heat exchanger or the like and the water vapor in the exhaust gas is recovered as condensed water.

The condensed water recovered is subjected to purification treatment with an ion exchange resin or the like and is once again used as reforming water for a reform reaction.

In this way, a fuel cell system is known in which a water self-sustaining operation is able to be carried out by recovering the water vapor in exhaust gas as condensed water without reforming water being supplied from outside.

A method in which water is used for the heat-receiving fluid of a heat exchanger is common as a method for cooling exhaust gas with a heat exchanger. Thus, a fuel cell system is known which is provided with a water storage tank that stores hot water that is output from a heat exchanger, and a heat recovery path by which water circulates through the water storage tank and the heat exchanger. However, in this fuel cell system, when the water storage tank is filled with hot water of a high temperature, the hot water flows to the heat exchanger as it is and the exhaust gas is not able to be cooled. Therefore, in this situation, there is a risk of it becoming difficult to recover condensed water.

Thus, a method has been proposed (Japanese Unexamined Patent Application Publication No. 2010-277973, for example) in which a water level detector that detects the water level of a condensed water tank is provided as a way of determining the success or failure of a water self-sustaining operation, and in the case where it is detected that the level of the condensed water is low, the output of the fuel cell system is decreased regardless of the power demand to reduce the amount of heat of the exhaust gas and increase the amount of circulation water. Thus, Japanese Unexamined Patent Application Publication No. 2010-277973 discloses that it is possible to ensure the amount of condensed water that is recovered.

Furthermore, a method has also been proposed in which, when a water self-sustaining operation fails, the output of a fuel cell system is increased in addition to the power demand by activating an auxiliary machine in the fuel cell system (Japanese Unexamined Patent Application Publication No. 2013-222577, for example). Thus, Japanese Unexamined Patent Application Publication No. 2013-222577 discloses that the amount of condensed water recovered is able to be increased.

SUMMARY

However, in these conventional examples, consideration has not been sufficiently given to responding to the case where a water self-sustaining operation of a fuel cell system is difficult due to environmental conditions, operating conditions, and the like.

An aspect of the present disclosure takes such circumstances into consideration and provides a fuel cell system that is able to operate continuously in an appropriate manner compared to the past in the case where the water self-sustaining operation of the fuel cell system is difficult due to environmental conditions, operating conditions, and the like.

In one general aspect, the techniques disclosed here feature a fuel cell system provided with: a reformer that produces fuel from a raw material and reforming water; a fuel cell that uses the fuel from the reformer to generate power; a condenser that cools exhaust gas from the fuel cell and condenses water vapor in the exhaust gas; a condensed water tank that recovers condensed water produced by the condenser; a reforming water supplier that supplies the condensed water in the condensed water tank to the reformer as the reforming water; a water level detector that detects the water level of the condensed water in the condensed water tank; an exhaust gas cooler that supplies, to the condenser, a cooling medium that cools the exhaust gas; a cooling determination device that is used to determine the exhaust gas cooling capability in the condenser brought about by the cooling medium; and a controller that, in the case where a first water level corresponding to a shortage of water in the condensed water tank is detected using the water level detector, implements a water-saving mode in which the output of the fuel cell is decreased regardless of the external power load and the amount of the reforming water used is reduced, and, in the case where it is determined using the cooling determination device during the water-saving mode that the exhaust gas cooling capability in the condenser brought about by the cooling medium is equal to or greater than a prescribed value, implements a water recovery mode in which the output of the fuel cell is increased regardless of the external power load and the amount of the condensed water recovered is increased.

A fuel cell system of an aspect of the present disclosure is able to operate continuously in an appropriate manner compared to the past in the case where the water self-sustaining operation of the fuel cell system is difficult due to environmental conditions, operating conditions, and the like.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

First Embodiment

Figure 1:
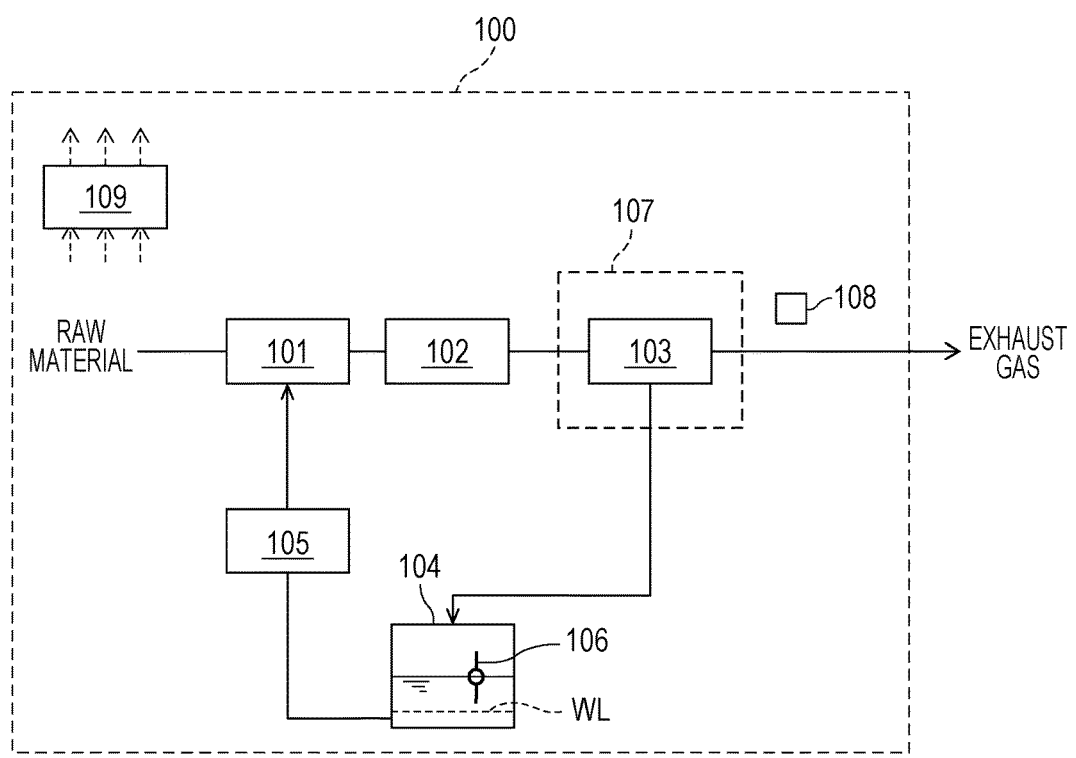
FIG. 1 is a drawing illustrating an example of a fuel cell system of a first embodiment.

The inventors discovered that it is possible for situations to occur in which condensed water is not able to be sufficiently ensured due to environmental conditions, operating conditions, and the like even when the methods of the conventional examples are used.

For example, in the fuel cell system of Japanese Unexamined Patent Application Publication No. 2010-277973, in the case where the temperature of the reformer and the fuel cell is controlled using air, there is a tendency for the airflow rate for controlling the temperature of the fuel cell to increase when the external air temperature in the summertime and so on is high. Therefore, there are situations in which the water vapor pressure of the exhaust gas decreases and the recovery of condensed water is not able to be sufficiently ensured due to the external air temperature.

Furthermore, in the fuel cell system of Japanese Unexamined Patent Application Publication No. 2013-222577, when the output of the fuel cell system is increased, the amount of combustion performed by a combustor also increases. Thus, the airflow rate increases due to the temperature control for the fuel cell. Therefore, there are situations in which the water vapor pressure of the exhaust gas decreases and the recovery of condensed water is not able to be sufficiently ensured due to the external air temperature.

It should be noted that although a fuel cell system provided with a cooler which air-cools hot water that flows through a heat recovery path has also been proposed, there is also a limit to the cooling of the hot water that flows through the heat recovery path when the external air temperature in the summertime and so on is high. Therefore, in this situation also, there is a risk that the amount of condensed water recovered by the heat exchanger may be insufficient and a water self-sustaining operation may become difficult.

Thus, the inventors carried out a diligent investigation with regard to responding to a situation in which a water self-sustaining operation of a fuel cell system is difficult due to environmental conditions, operating conditions, and the like and arrived at the following ideas.

A method that increases the water recovery amount at the point in time when a water self-sustaining operation fails is not always effective, as described above. Therefore, an operation to reduce the reforming water usage amount to the utmost is carried out when a water self-sustaining operation fails. To be specific, the output of the fuel cell system is decreased to the lowest output regardless of the external power load. However, in this state, because only water is consumed, a continuous water self-sustaining operation of the fuel cell system becomes difficult. Therefore, when it has been possible to determine that the exhaust gas cooling capability in a condenser is sufficient for condensing the water vapor in the exhaust gas, the output of the fuel cell system is increased and the amount of condensed water recovered is increased. For example, the output of the fuel cell system is increased to the highest output.

In other words, the fuel cell system of the first embodiment is provided with: a reformer that produces fuel from a raw material and reforming water; a fuel cell that uses the fuel from the reformer to generate power; a condenser that cools exhaust gas from the fuel cell and condenses water vapor in the exhaust gas; a condensed water tank that recovers condensed water produced by the condenser; a reforming water supplier that supplies the condensed water in the condensed water tank to the reformer as the reforming water; a water level detector that detects the water level of the condensed water in the condensed water tank; an exhaust gas cooler that supplies, to the condenser, a cooling medium that cools the exhaust gas; a cooling determination device that is used to determine the exhaust gas cooling capability in the condenser brought about by the cooling medium; and a controller that, in the case where a first water level corresponding to a shortage of water in the condensed water tank is detected using the water level detector, implements a water-saving mode in which the output of the fuel cell is decreased regardless of an external power load and the amount of the reforming water used is reduced, and, in the case where it is determined using the cooling determination device during the water-saving mode that the exhaust gas cooling capability is equal to or greater than a prescribed value, implements a water recovery mode in which the output of the fuel cell is increased regardless of the external power load and the amount of the condensed water recovered is increased.

According to this configuration, it is possible for a fuel cell system to operate continuously in an appropriate manner compared to the past in the case where the water self-sustaining operation of the fuel cell system is difficult due to environmental conditions, operating conditions, and the like. For example, when external air is used for a cooling medium that cools exhaust gas and the external air temperature in the summertime and so on is high, the amount of water consumed from a condensed water tank can be suppressed to the minimum by implementing a water-saving mode compared to the case where condensed water is recovered by altering the output of a fuel cell. It is therefore possible to reduce the possibility of entering a situation in which the operation of a fuel cell system is not able to be carried out due to environmental conditions, operating conditions, and the like. Furthermore, the amount of water in the condensed water tank is able to be quickly supplemented by implementing a water recovery mode. It is therefore possible for the water self-sustaining operation of a fuel cell system to be continued in an appropriate manner even in the case where there are successive days in which the external air temperature in the summertime and so on is high, for example.

[Device Configuration]

FIG. 1 is a drawing illustrating an example of a fuel cell system of the first embodiment.

As illustrated in FIG. 1, a fuel cell system 100 is provided with a reformer 101, a fuel cell 102, a condenser 103, a condensed water tank 104, a reforming water supplier 105, a water level detector 106, an exhaust gas cooler 107, a cooling determination device 108, and a controller 109.

The reformer 101 produces fuel from a raw material and reforming water. To be specific, in the reformer 101, the raw material is subjected to a reform reaction and a hydrogen gas-containing fuel is produced. A possible example of the reform reaction is a water vapor reform reaction or an autothermal reaction. Although not illustrated in the drawing, the devices that are necessary in each reform reaction are provided as appropriate. For example, if the reform reaction is a water vapor reform reaction, a combustor that heats the reformer 101 and an evaporator that produces water vapor from reforming water are provided. An air supplier that supplies air to the reformer 101 is additionally provided in the fuel cell system 100 if the reform reaction is an autothermal reaction. It should be noted that the raw material includes organic compounds formed from at least carbon and hydrogen such as town gas, natural gas, LPG or the like in which methane is the main component.

Furthermore, a raw material supplier may be provided on a raw material supply path upstream from the reformer 101. The raw material supplier is a device that adjusts the flow rate of the raw material to be supplied to the reformer 101. For example, the raw material supplier may be configured from a booster and a flow rate adjustment valve and may be configured from either one of these. A possible example of the booster is a pump or the like, and a possible example of a pump is a motor-driven fixed capacity-type pump or the like. The raw material is supplied from a raw material supply source. The raw material supply source has a prescribed supply pressure. A possible example of a raw material supply source is a raw material gas cylinder, a raw material gas infrastructure, or the like.

Furthermore, there are cases where a sulfur compound is included in the raw material. In such cases, a desulfurizer may be provided on the raw material supply path upstream from the reformer 101.

The fuel cell 102 uses the fuel from the reformer 101 to generate power. For example, the fuel cell 102 is provided with a cell structure in which an electrolyte is positioned between an anode electrode and a cathode electrode, and generates power by fuel (hydrogen-containing gas) from the reformer 101 being supplied to the anode and air (oxygen-containing gas) being supplied to the cathode. The fuel cell 102 thus constitutes a stack in which a plurality of such cell structures are electrically linked in series and a voltage of several volts to several hundred volts is generated. Furthermore, the fuel cell 102 is provided with a manifold that distributes and supplies air and fuel gas to each cell, and a current collecting unit. Although not illustrated in the drawing, it should be noted that the fuel cell system 100 is provided with an air supplier that supplies air to the cathode of the fuel cell 102. The air supplier is a device that adjusts the flow rate of the air used to generate power by the fuel cell 102. The air supplier may be configured from a booster and a flowmeter or the like, for example. A possible example of a booster is a pump or the like. A possible example of a pump is an electromagnetically driven diaphragm pump or the like. Furthermore, a possible example of a flowmeter is a heat quantity sensor or the like.

The fuel cell 102 is classified into a solid polymer type, a solid oxide type, a molten carbonate type, a phosphoric acid type, an alkali type, and the like according to the type of electrolyte of the cell structure. The fuel cell 102 may be any of these types. For example, in the case where the fuel cell 102 is a solid oxide-type fuel cell, a solid electrolyte of yttria-stabilized zirconia (YSZ) that is zirconia ($ZrO_2$) to which a yttrium (Y) oxide ($Y_2O_3$) has been added, or zirconia in which ytterbium (Yb) or scandium (Sc) has been doped is used for the electrolyte, for example. In a fuel cell unit cell in which YSZ is used, a power generation reaction is carried out at a temperature range of approximately 500° C. to 1000° C., for example, although this is dependent on the thickness of the electrolyte. A mixture of nickel (Ni) and YSZ or a mixture in which gadolinium (Gd) has been added to an oxide ($CeO_2$) of nickel and cerium (Ce) is used as the material of the anode, for example. Meanwhile, an oxide containing lanthanum, strontium, and manganese, or an oxide containing lanthanum, strontium, cobalt, and iron is used as the material of the cathode, for example. Furthermore, in a solid oxide-type fuel cell such as this, there are cases where the reformer 101 and the fuel cell 102 are treated as a single unit and are referred to as a fuel cell module.

The structure of the cells that make up the fuel cell 102 may be any of what are known as a planar type, a cylindrical type, a cylindrical planar type, or the like. It should be noted that anode off-gas and cathode off-gas are discharged from the fuel cell 102 and merge at an outlet of the fuel cell 102. Thus, exhaust gas is produced as a result of these gases being combusted.

The condenser 103 cools exhaust gas from the fuel cell 102 and condenses the water vapor in the exhaust gas. The condenser 103 may have any kind of configuration as long as it is able to condense the water vapor in the exhaust gas. The condenser 103 may be a heat exchanger that cools the exhaust gas from the fuel cell 102 by heat exchange with an appropriate coolant, for example. The heat exchanger may be provided with a heat dissipation fin that is used for air-cooling, for example. Furthermore, the exhaust gas temperature is a high temperature of approximately 150° C. to 350° C., and a flow path member of the heat exchanger is therefore formed of a metal such as SUS.

The condensed water tank 104 recovers condensed water produced by the condenser 103. As described above, in the condenser 103, the water vapor in the exhaust gas is cooled and the water vapor is condensed. Thus, the condensed water tank 104 is linked to the condenser 103 using piping or the like, and is therefore a vessel that is able to store condensed water from the condenser 103. Members of the condensed water tank 104 are configured from a metal or a resin or the like, for example.

Furthermore, the capacity of the condensed water tank 104 is determined from the amount of water consumed when the fuel cell system 100 is activated and stopped, which is not able to be recovered by condensed water from the exhaust gas, for example. In the present embodiment, the capacity is set so that the amount of water consumed in a water-saving mode described hereinafter is able to be ensured in addition to the amount of water consumed during activation and stopping. For example, the capacity may be set so that it is possible to ensure the amount of reforming water required in the lowest output operation of the fuel cell system 100 for approximately eight hours, for example. It should be noted that the capacity of the condensed water tank 104 is exemplary and is not restricted to this example.

The reforming water supplier 105 supplies the condensed water in the condensed water tank 104 to the reformer 101 as reforming water. To be specific, the reforming water supplier 105 is a device that adjusts the flow rate of the reforming water supplied to the evaporator provided in the reformer 101. The reforming water supplier 105 may have any kind of configuration as long as it is able to adjust the flow rate of the reforming water. A possible example of the reforming water supplier 105 is a pump or the like. A possible example of a pump is a cylinder-type self-feeding pump that is able to adjust the flow rate of reforming water by the motor rotation speed, for example.

The water level detector 106 detects the water level of the condensed water in the condensed water tank 104. The water level detector 106 may have any kind of configuration as long as it is able to detect the water level of the condensed water in the condensed water tank 104. A possible example of the water level detector 106 is a float switch or the like. A float-type reed switch that detects a first water level WL corresponding to a shortage of water in the condensed water tank 104 is given as a float switch in the present embodiment; however, the present disclosure is not restricted thereto.

The exhaust gas cooler 107 supplies, to the condenser 103, a cooling medium that cools the exhaust gas. The exhaust gas cooler 107 may have any kind of configuration as long as it is able to supply the condenser 103 with a cooling medium that cools exhaust gas. Specific examples of the exhaust gas cooler 107 will be described in the first embodiment and the second embodiment. It should be noted that possible examples of the cooling medium are air (external air), water, and the like.

The cooling determination device 108 is used to determine the exhaust gas cooling capability in the condenser 103 brought about by the cooling medium. The cooling determination device 108 may have any kind of configuration as long as it is able to be used to determine the exhaust gas cooling capability in the condenser 103 brought about by the cooling medium. Specific examples of the cooling determination device 108 will be described in a second working example and the second embodiment.

In the case where the first water level WL corresponding to a shortage of water in the condensed water tank 104 is detected using the water level detector 106, the controller 109 implements a water-saving mode in which the output of the fuel cell 102 is decreased regardless of the external power load and the amount of reforming water used is reduced, and, in the case where it is determined using the cooling determination device 108 during the water-saving mode that the exhaust gas cooling capability is equal to or greater than a prescribed value, the controller 109 implements a water recovery mode in which the output of the fuel cell 102 is increased regardless of the external power load and the amount of condensed water recovered is increased.

It is sufficient for the controller 109 to have a control function, and the controller 109 is provided with a computation processing unit and a storage unit that stores a control program. A possible example of the computation processing unit is an MPU, a CPU, or the like. A possible example of the storage unit is a memory or the like. The controller 109 may be constituted by an individual controller that carries out centralized control, and may be constituted by controllers that cooperate with each other to carry out distributed control.

[Operation]

Figure 2:
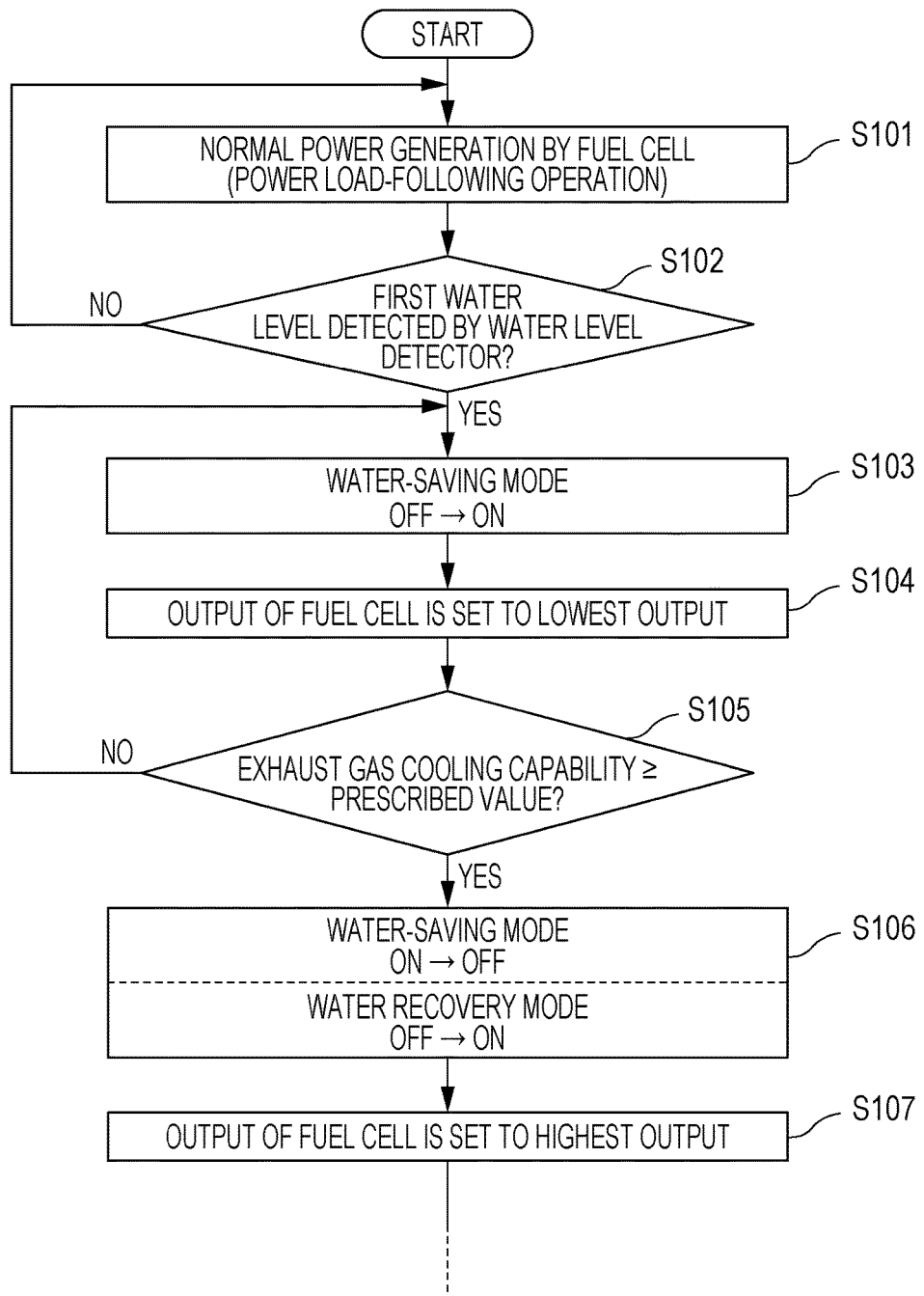
FIG. 2 is a flowchart illustrating an example of the operation of a fuel cell system of the first embodiment.

FIG. 2 is a flowchart illustrating an example of the operation of the fuel cell system of the first embodiment. It should be noted that the operation described hereinafter is carried out by the control program of the controller 109.

First, during normal operation, the fuel cell system 100 operates while altering the output in accordance with an external power load (the power demand of a household, for example) (step S101). It should be noted that both the water-saving mode and the water recovery mode described hereinafter are in an OFF state in step S101.

At such time, it is determined whether or not the first water level WL corresponding to a shortage of water in the condensed water tank 104 has been detected using the water level detector 106 (step S102). In the case where the first water level WL is not detected, the operation of step S101 is continued. However, in the case where the first water level WL is detected, the operation proceeds to the next step S103.

In step S103, a water-saving mode flag is set to ON. In other words, because a shortage of water in the condensed water tank 104 is detected in step S102, the controller 109 issues an instruction for the fuel cell system 100 to switch from the normal operation to the water-saving mode.

Next, when the instruction to switch to the water-saving mode is output, the output of the fuel cell 102 is decreased regardless of the external power load and the amount of reforming water used is reduced. In the present example, the output of the fuel cell 102 is set to the lowest regardless of the external power load (step S104). In other words, the reforming water supplier 105, the raw material supplier, and the like are controlled in such a way that the output of the fuel cell 102 becomes the lowest output. For example, as the lowest output of the fuel cell 102, the fuel cell system 100 may be controlled in such a way that power is not supplied to outside and the output power required only for the operation of the fuel cell system 100 is provided.

Next, the cooling determination device 108 is used to determine during the water-saving mode whether or not the exhaust gas cooling capability in the condenser 103 brought about by the cooling medium is equal to or greater than a prescribed value (step S105).

In step S105, in the case where the exhaust gas cooling capability in the condenser 103 brought about by the cooling medium falls below the prescribed value, it is determined that the cooling capability for exhaust gas in the condenser 103 brought about by the cooling medium is insufficient for condensing the water vapor in the exhaust gas. In this case, the operation of step S104 is continued. However, in the case where the exhaust gas cooling capability in the condenser 103 brought about by the cooling medium is equal to or greater than the prescribed value, it is determined that the cooling capability for exhaust gas in the condenser 103 brought about by the cooling medium is sufficient for condensing the water vapor in the exhaust gas and the operation proceeds to the next step S106.

In this way, the water-saving mode (step S103 and step S104) is an operation mode in which, in response to there being a shortage of condensed water in the condensed water tank 104 (in other words, in response to a situation in which the water self-sustaining operation is difficult), the amount of condensed water in the condensed water tank 104 that is consumed is suppressed to the minimum in such a way that the operation of the fuel cell system 100 is continued.

In step S106, a water recovery mode flag is set to ON. At the same time, the water-saving mode flag is set to OFF since the water-saving mode is not necessary. In other words, since it is determined in step S105 that the cooling capability for exhaust gas in the condenser 103 brought about by the cooling medium is sufficient for condensing the water vapor in the exhaust gas, the controller 109 outputs an instruction for the fuel cell system 100 to switch from the water-saving mode to the water recovery mode.

Next, when the instruction for switching to the water recovery mode is output, the output of the fuel cell 102 is increased regardless of the external power load and the amount of condensed water recovered is increased. In the present example, the output of the fuel cell 102 is set to the highest regardless of the external power load (step S107). In other words, the reforming water supplier 105, the raw material supplier, and the like are controlled in such a way that the output of the fuel cell 102 becomes the highest output.

In this way, the water recovery mode (step S106 and step S107) is an operation mode in which, in response to conditions in which it is easy for condensed water to be recovered in the condensed water tank 104, the water self-sustaining operation of the fuel cell system 100 is enabled regardless of the operating conditions of the following day by carrying out active recovery of condensed water from exhaust gas with the aim of filling the condensed water tank 104.

According to the above, in the fuel cell system 100 of the present embodiment, it is possible for the fuel cell system 100 to operate continuously in an appropriate manner compared to the past in the case where the water self-sustaining operation of the fuel cell system 100 is difficult due to environmental conditions, operating conditions, and the like. For example, when external air is used for a cooling medium that cools exhaust gas and the external air temperature in the summertime and so on is high, the amount of water consumed from the condensed water tank 104 can be suppressed to the minimum by implementing a water-saving mode compared to the case where condensed water is recovered by altering the output of the fuel cell 102. It is therefore possible to reduce the possibility of entering a situation in which the operation of the fuel cell system 100 is not able to be carried out due to environmental conditions, operating conditions, and the like. Furthermore, the amount of water in the condensed water tank 104 is able to be quickly supplemented by implementing the water recovery mode. It is therefore possible for the water self-sustaining operation of the fuel cell system 100 to be continued in an appropriate manner even in the case where there are successive days in which the external air temperature in the summertime and so on is high, for example.

Modified Example 1

In the fuel cell system of modified example 1 of the first embodiment, in the case where a second water level corresponding to a full water state of the condensed water tank is detected using the water level detector during the aforementioned water recovery mode in the fuel cell system of the first embodiment, the controller stops this water recovery mode.

According to this configuration, since the water recovery mode is stopped according to the detection of the second water level corresponding to a full water state of the condensed water tank, the amount of water in the condensed water tank is able to be recovered to an appropriate amount compared to the case where the water recovery mode is stopped according to a form of time control such as a timer. It is therefore possible for the water self-sustaining operation of the fuel cell system to be continued in an appropriate manner even in the case where external air is used for a cooling medium that cools exhaust gas and there are successive days in which the external air temperature in the summertime and so on is high, for example.

The power generation system of the present modified example 1 may be configured in the same way as the power generation system of the first embodiment, except for the aforementioned feature.

[Device Configuration]

Figure 3:
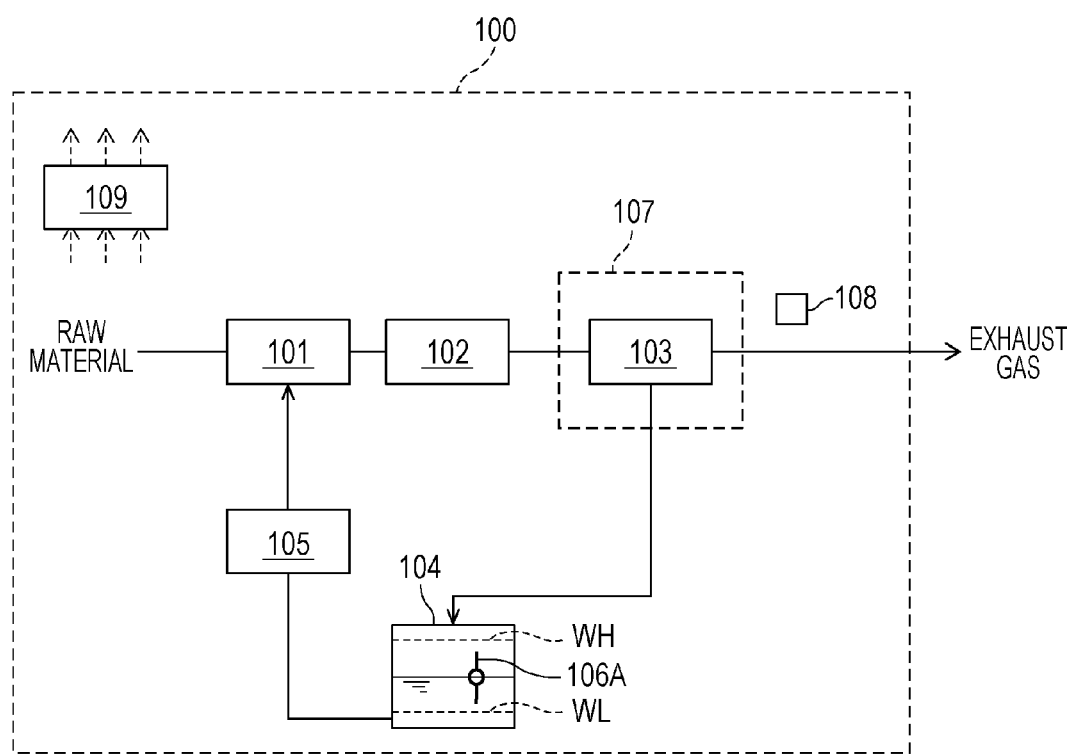
FIG. 3 is a drawing illustrating an example of a fuel cell system of modified example 1 of the first embodiment.

FIG. 3 is a drawing illustrating an example of the fuel cell system of modified example 1 of the first embodiment.

As illustrated in FIG. 3, the fuel cell system 100 is provided with the reformer 101, the fuel cell 102, the condenser 103, the condensed water tank 104, the reforming water supplier 105, a water level detector 106A, the exhaust gas cooler 107, the cooling determination device 108, and the controller 109.

The reformer 101, the fuel cell 102, the condenser 103, the condensed water tank 104, the reforming water supplier 105, the exhaust gas cooler 107, and the cooling determination device 108 are the same as in the first embodiment and descriptions thereof are therefore omitted.

A two-contact float-type reed switch that detects both the first water level WL corresponding to a shortage of water in the condensed water tank 104 and the second water level WH corresponding to a full water state of the condensed water tank 104 is given as an example of the water level detector 106A in the present modified example 1.

The controller 109 stops the aforementioned water recovery mode in the case where the second water level WH corresponding to a full water state of the condensed water tank is detected using the water level detector 106A during this water recovery mode.

[Operation]

Figure 4:
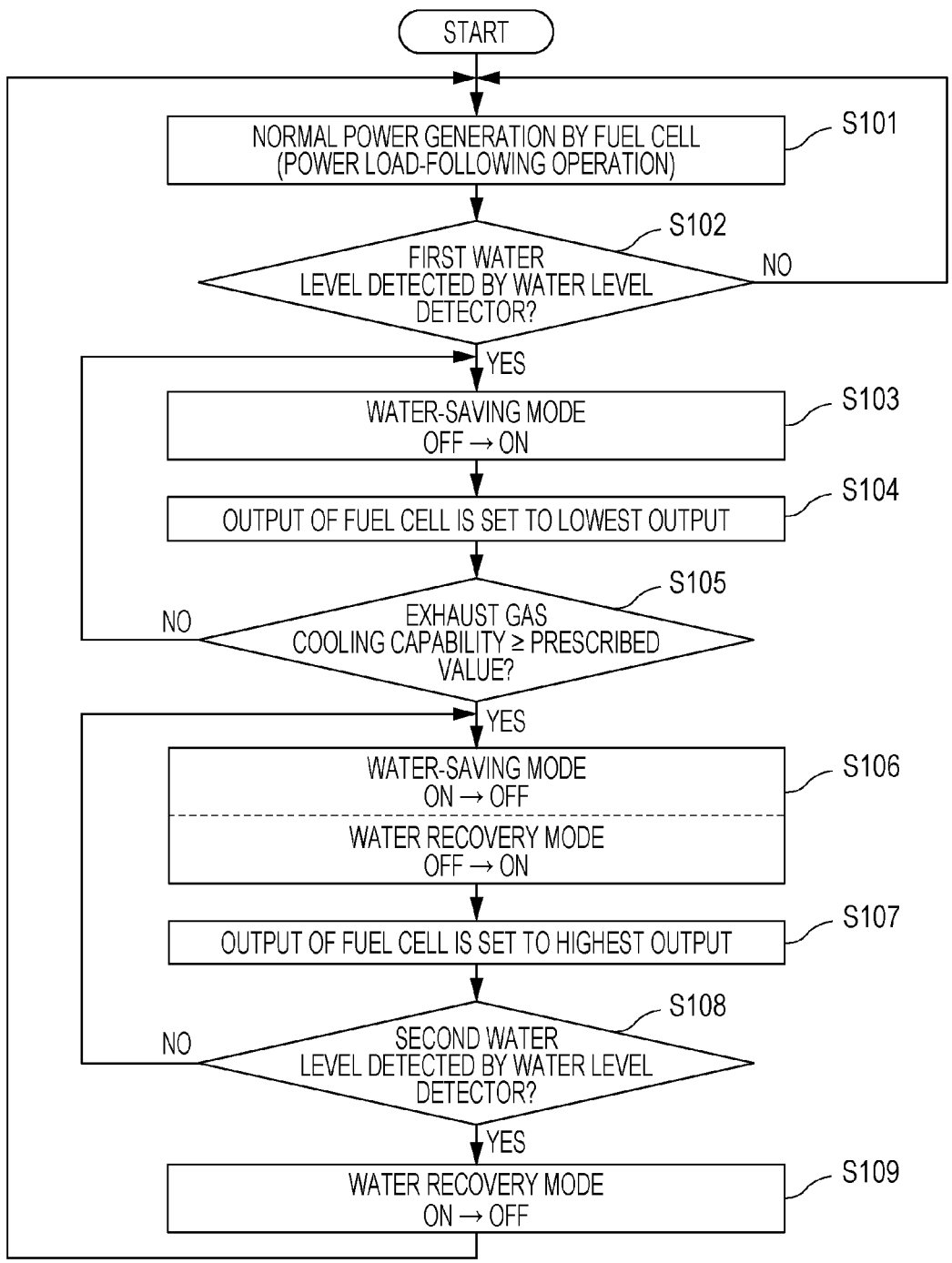
FIG. 4 is a flowchart illustrating an example of the operation of the fuel cell system of modified example 1 of the first embodiment.

FIG. 4 is a flowchart illustrating an example of the operation of the fuel cell system of modified example 1 of the first embodiment. It should be noted that the operation described hereinafter is carried out by the control program of the controller 109.

Step S101 to step S107 of FIG. 4 are the same as in the first embodiment and descriptions thereof are therefore omitted.

As illustrated in FIG. 4, it is determined whether or not the second water level WH corresponding to a full water state of the condensed water tank 104 is detected using the water level detector 106A during the water recovery mode of step S106 (step S108). In the case where the second water level WH is not detected, the water recovery mode of the fuel cell system 100 is continued. However, in the case where the second water level WH is detected, the operation proceeds to the next step S109.

In the case where the second water level WH is detected, the inside of the condensed water tank 104 has been filled with condensed water and the water recovery mode is no longer necessary. Thus, in step S109, the water recovery mode flag is set to OFF and the water recovery mode therefore stops. The operation then returns to step S101 and normal operation of the fuel cell system 100 is carried out.

According to the above, in the fuel cell system 100 of the present modified example 1, since the water recovery mode is stopped according to the detection of the second water level WH corresponding to a full water state of the condensed water tank 104, the amount of water in the condensed water tank 104 is able to be recovered to an appropriate amount compared to the case where the water recovery mode is stopped according to a form of time control such as a timer. It is therefore possible for the water self-sustaining operation of the fuel cell system 100 to be continued in an appropriate manner even in the case where external air is used for a cooling medium that cools exhaust gas and there are successive days in which the external air temperature in the summertime and so on is high, for example.

Modified Example 2

In the fuel cell system of modified example 2 of the first embodiment, a display device that notifies an operation state is provided in the fuel cell system of the first embodiment and each operation mode selected by the controller is displayed.

By adopting this configuration, the user is able to know by way of the display device that the fuel cell system is implementing a special operation mode such as the "water-saving mode" or the "water recovery mode". Therefore, in the case where, for example, the fuel cell system has indicated a power generation state that is inconsistent with the power demand, the user recognizes that a special mode operation is being carried out and confidence in the fuel cell system is able to be maintained.

The fuel cell system of the present modified example 2 may be configured in the same way as the fuel cell system of the first embodiment, except for the aforementioned feature.

[Device Configuration]

Figure 5:
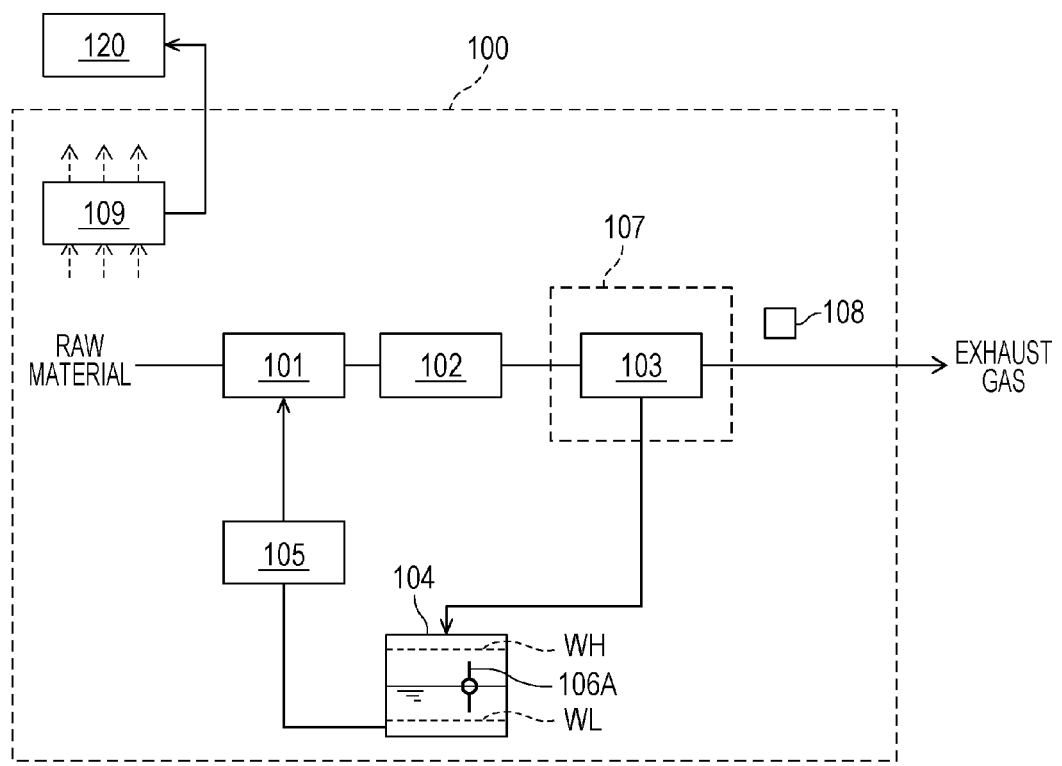
FIG. 5 is a drawing illustrating an example of a fuel cell system of modified example 2 of the first embodiment.

FIG. 5 is a drawing illustrating an example of the fuel cell system of modified example 2 of the first embodiment.

As illustrated in FIG. 5, the fuel cell system 100 is provided with the reformer 101, the fuel cell 102, the condenser 103, the condensed water tank 104, the reforming water supplier 105, the water level detector 106A, the exhaust gas cooler 107, the cooling determination device 108, the controller 109, and a display device 120.

The reformer 101, the fuel cell 102, the condenser 103, the condensed water tank 104, the reforming water supplier 105, the water level detector 106A, the exhaust gas cooler 107, and the cooling determination device 108 are the same as in modified example 1 of the first embodiment and descriptions thereof are therefore omitted.

The display device 120 is exemplified in the present modified example 2.

The display device 120 receives a signal for each operation mode from the controller 109 and displays the operation mode corresponding to the signal in question. The display device 120 may be a remote control provided with a microcomputer and a liquid crystal screen, for example.

In the case where a shortage of water is determined by the water level detector 106A, the controller 109 switches the operation of the fuel cell system from the normal operation to the water-saving mode and transmits that information to the display device 120. In the case where it is determined by the cooling determination device 108 that the exhaust gas cooling capacity is equal to or greater than a predetermined value, the operation is switched from the water-saving mode to the water recovery mode and that information is transmitted to the display device 120. Furthermore, in the case where the water level detector 106A has determined that there is a full amount of water, the operation is switched from the water recovery mode to the normal operation and that information is transmitted to the display device 120.

[Operation]

Figure 6:
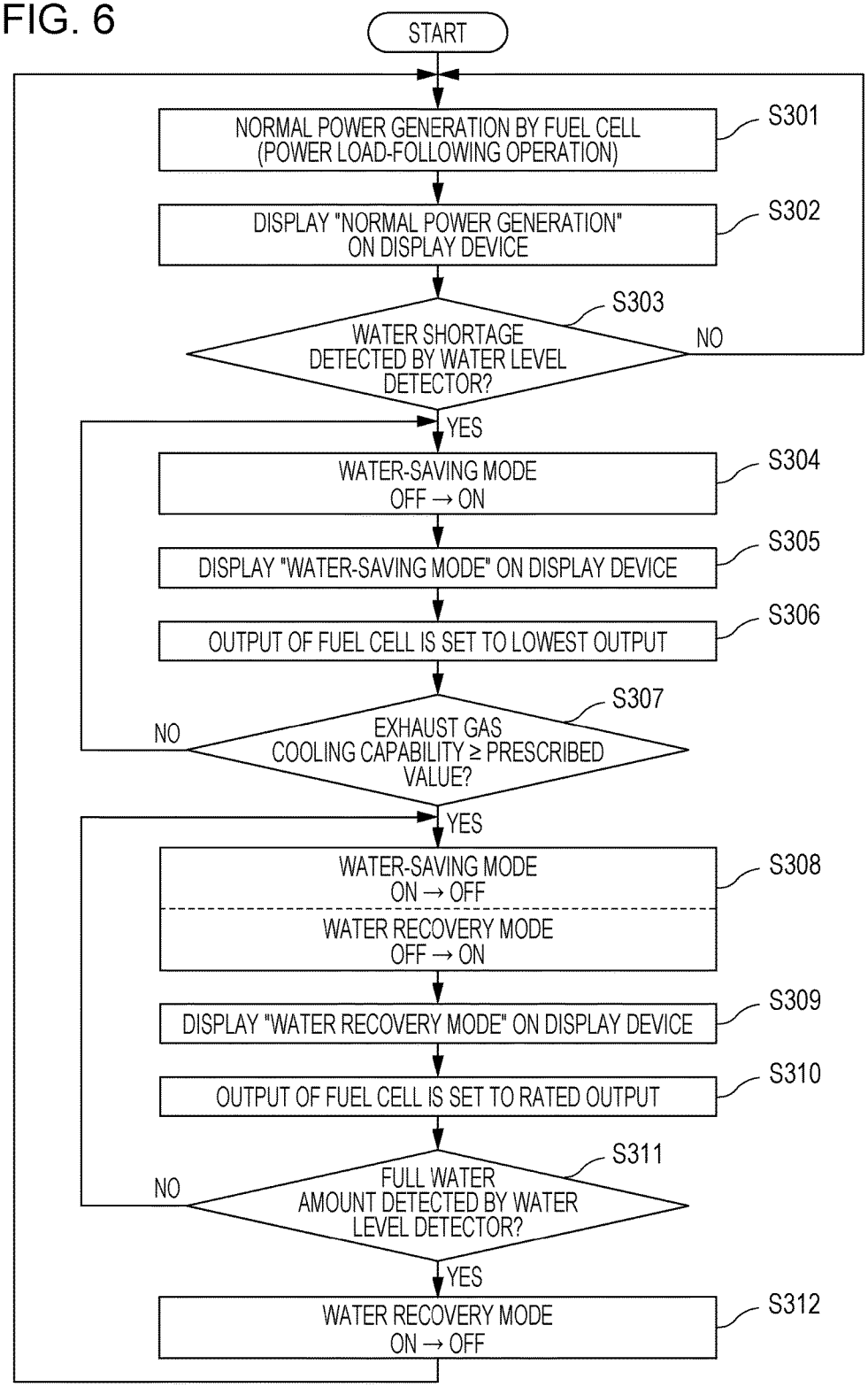
FIG. 6 is a flowchart illustrating an example of the operation of the fuel cell system of modified example 2 of the first embodiment.

FIG. 6 is a flowchart illustrating an example of the operation of the fuel cell system of modified example 2 of the first embodiment. It should be noted that the operation described hereinafter is carried out by the control program of the controller 109.

First, during the normal operation, the fuel cell system 100 operates while altering the output in accordance with the external power load (the power demand of a household, for example) (step S301). At such time, information of the normal operation is transmitted from the controller 109 to the display device 120. It should be noted that, in step S301, both the water-saving mode and the water recovery mode described hereinafter are in an OFF state.

The display device 120 displays "normal power generation" on the display device on the basis of the received information (step S302).

At such time, it is determined whether or not the first water level WL corresponding to a shortage of water in the condensed water tank 104 has been detected using the water level detector 106A (step S303). In the case where the first water level WL is not detected, the operation of step S301 is continued. However, in the case where the first water level WL is detected, the operation proceeds to the next step S304.

In step S304, the water-saving mode flag is set to ON. In other words, because a shortage of water in the condensed water tank 104 is detected in step S303, the controller 109 issues an instruction for the fuel cell system 100 to switch from the normal operation to the water-saving mode. At the same time as this, the controller 109 transmits information indicating that the water-saving mode is ON to the display device 120.

The display device 120 displays "water-saving mode" on the display device on the basis of the received information (step S305).

Next, when the instruction to switch to the water-saving mode is output, the output of the fuel cell 102 is decreased and the amount of reforming water used is reduced. In the present example, the output of the fuel cell 102 is set to the lowest (step S306). In other words, the reforming water supplier 105, the raw material supplier, and the like are controlled in such a way that the output of the fuel cell 102 becomes the lowest output. For example, as the lowest output of the fuel cell 102, the fuel cell system 100 may be controlled in such a way that power is not supplied to outside and the output power required only for the operation of the fuel cell system 100 is provided.

Next, the cooling determination device 108 is used to determine during the water-saving mode whether or not the exhaust gas cooling capability in the condenser 103 brought about by the cooling medium is equal to or greater than a prescribed value (step S307).

In step S307, in the case where the exhaust gas cooling capability in the condenser 103 brought about by the cooling medium falls below the prescribed value, it is determined that the cooling capability for exhaust gas in the condenser 103 brought about by the cooling medium is insufficient for condensing the water vapor in the exhaust gas. In this case, the operation of step S304 is continued. However, in the case where the exhaust gas cooling capability in the condenser 103 brought about by the cooling medium is equal to or greater than the prescribed value, it is determined that the cooling capability for exhaust gas in the condenser 103 brought about by the cooling medium is sufficient for condensing the water vapor in the exhaust gas and the operation proceeds to the next step S308.

In step S308, the water recovery mode flag is set to ON. At the same time, the water-saving mode flag is set to OFF since the water-saving mode is not necessary. In other words, in step S307, since it is determined that the cooling capability for exhaust gas in the condenser 103 brought about by the cooling medium is sufficient for condensing the water vapor in the exhaust gas, the controller 109 outputs an instruction for the fuel cell system 100 to switch from the water-saving mode to the water recovery mode. At the same time as this, the controller 109 transmits information indicating that the water recovery mode is ON to the display device 120.

The display device 120 displays "water recovery mode" on the display device on the basis of the received information (step S309).

Next, when the instruction for switching to the water recovery mode is output, the output of the fuel cell 102 is increased and the amount of condensed water recovered is increased. In the present example, the output of the fuel cell 102 is set to the highest (step S310). In other words, the reforming water supplier 105, the raw material supplier, and the like are controlled in such a way that the output of the fuel cell 102 becomes the highest output.

It is then determined whether or not the second water level WH corresponding to a full water state of the condensed water tank 104 is detected using the water level detector 106A during the water recovery mode of step S308 (step S311). In the case where the second water level WH is not detected, the water recovery mode of the fuel cell system 100 is continued. However, in the case where the second water level WH is detected, the operation proceeds to the next step S312.

In the case where the second water level WH is detected, the inside of the condensed water tank 104 has been filled with condensed water and the water recovery mode is no longer necessary. Thus, the water recovery mode flag is set to OFF in step S312 and the water recovery mode therefore stops. At the same time, the controller 109 transmits information indicating that the water recovery mode is OFF to the display device 120. The operation then returns to step S301 and normal operation of the fuel cell system 100 is carried out.

As described above, by displaying each operation mode on the display device, the user is able to recognize that a special mode operation is being carried out and grasp the operation of the fuel cell system even in the case where the fuel cell system has indicated a power generation state that is inconsistent with the power demand.

First Working Example

In the fuel cell system of a first working example of the first embodiment, the cooling medium that cools exhaust gas is external air and the exhaust gas cooler is a blower that sends the external air to the condenser in the fuel cell system of the first embodiment or modified example 1 of the first embodiment.

According to this configuration, the water recovery mode can be easily carried out using conditions in which the external air temperature during the night and so on is low, for example. It is therefore possible for the water self-sustaining operation of the fuel cell system to be continued in an appropriate manner even in the case where there are successive days in which the external air temperature in the summertime and so on is high.

The power generation system of the present working example may be configured in the same way as the power generation system of the first embodiment or modified example 1 of the first embodiment, except for the aforementioned feature.

[Device Configuration]

Figure 7:
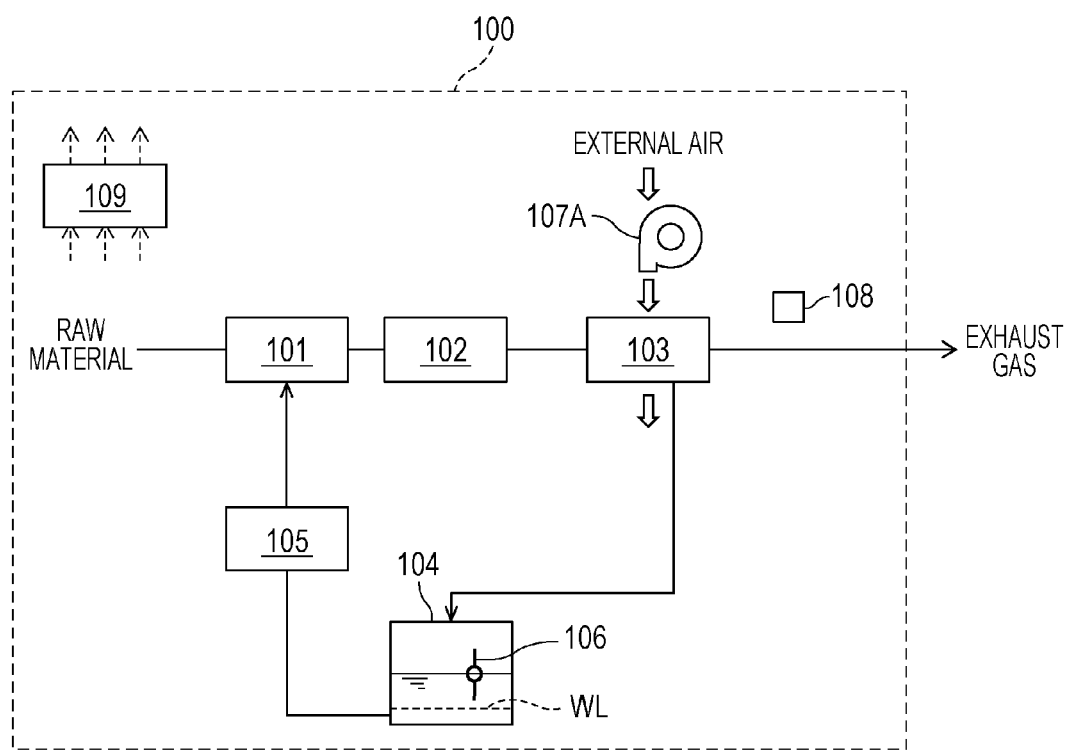
FIG. 7 is a drawing illustrating an example of a fuel cell system of a first working example of the first embodiment.

FIG. 7 is a drawing illustrating an example of the fuel cell system of the first working example of the first embodiment.

As illustrated in FIG. 7, the fuel cell system 100 is provided with the reformer 101, the fuel cell 102, the condenser 103, the condensed water tank 104, the reforming water supplier 105, the water level detector 106, an exhaust gas cooler 107A, the cooling determination device 108, and the controller 109.

The reformer 101, the fuel cell 102, the condenser 103, the condensed water tank 104, the reforming water supplier 105, the water level detector 106, the cooling determination device 108, and the controller 109 are the same as in the first embodiment and descriptions thereof are therefore omitted.

The exhaust gas cooler 107A is provided with a blower that sends external air to the condenser 103. In other words, in the present working example, air (external air) is used as the cooling medium that cools exhaust gas. The blower may have any kind of configuration as long as it is able to send external air to the condenser 103. A possible example of a blower is a turbo fan or the like.

FIG. 7 illustrates an example in which the exhaust gas cooler 107 of FIG. 1 is provided with a blower; however, it should be noted that the present disclosure is not restricted thereto. The exhaust gas cooler 107 of FIG. 3 may be provided with a blower.

According to the above, the water recovery mode can be easily carried out using conditions in which the external air temperature during the night and so on is low, for example. It is therefore possible for the water self-sustaining operation of the fuel cell system 100 to be continued in an appropriate manner even in the case where there are successive days in which the external air temperature in the summertime and so on is high.

Second Working Example

With regard to the fuel cell system of a second working example of the first embodiment, the cooling determination device is a temperature detector that detects either one or both of the temperature of external air that is sent to the condenser and the temperature of exhaust gas that has passed through the condenser, and the controller implements the aforementioned water recovery mode in the case where the temperature detected by the temperature detector is equal to or less than a prescribed temperature, in the fuel cell system of any of the first embodiment, modified example 1 of the first embodiment, and the first working example of the first embodiment.

According to this configuration, a condition for implementing the water recovery mode in which condensed water is recovered can be appropriately and easily set using the temperature detector. It is therefore possible for the water self-sustaining operation of the fuel cell system to be continued in an appropriate manner even in the case where there are successive days in which the external air temperature in the summertime and so on is high.

The power generation system of the present working example may be configured in the same way as the fuel cell system of any of the first embodiment, modified example 1 of the first embodiment, or the first working example of the first embodiment, except for the aforementioned feature.

[Device Configuration]

Figure 8:
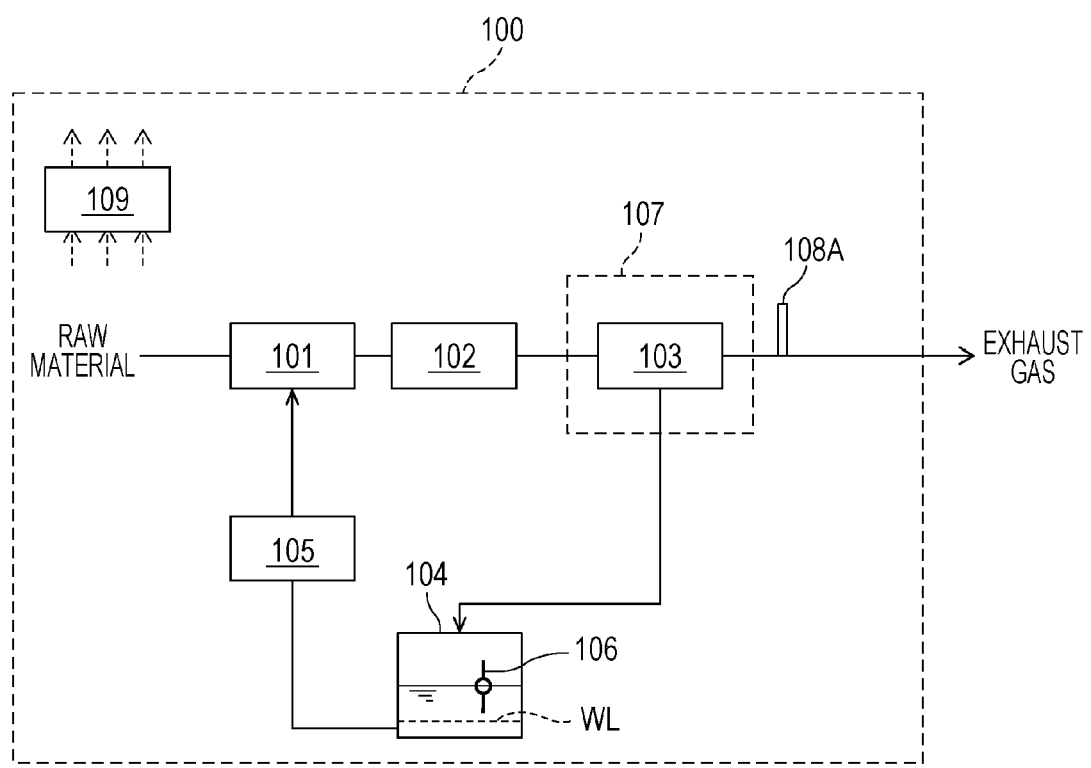
FIG. 8 is a drawing illustrating an example of a fuel cell system of a second working example of the first embodiment.

FIG. 8 is a drawing illustrating an example of a fuel cell system of the second working example of the first embodiment.

As illustrated in FIG. 8, the fuel cell system 100 is provided with the reformer 101, the fuel cell 102, the condenser 103, the condensed water tank 104, the reforming water supplier 105, the water level detector 106, the exhaust gas cooler 107, a cooling determination device, and the controller 109.

The reformer 101, the fuel cell 102, the condenser 103, the condensed water tank 104, the reforming water supplier 105, the water level detector 106, and the exhaust gas cooler 107 are the same as in the first embodiment and descriptions thereof are therefore omitted.

The cooling determination device is a temperature detector 108A that detects either one or both of the temperature of external air that is sent to the condenser 103 and the temperature of exhaust gas that has passed through the condenser 103. The temperature detector 108A may have any kind of configuration as long as it is able to directly or indirectly detect either one or both of the temperature of external air that is sent to the condenser 103 and the temperature of exhaust gas that has passed through the condenser 103.

For example, an exhaust gas temperature that is downstream of the condenser 103 may be directly detected, or the temperature detector 108A may be provided in a prescribed location that correlates with the exhaust gas temperature (for example, the surface or the like of a pipe constituting an exhaust gas flow path) and the temperature of the exhaust gas may be indirectly detected. By detecting the temperature of the exhaust gas that has passed through the condenser 103, it is understood whether or not the exhaust gas has been sufficiently cooled in the condenser 103 by heat exchange with external air. The exhaust gas cooling capability in the condenser 103 is therefore able to be determined.

Furthermore, the temperature of the external air that flows into the condenser 103 may be directly detected, or the temperature detector 108A may be provided in a prescribed location that correlates with the external air temperature and the external air temperature may be indirectly detected. By detecting the temperature of the external air that flows into the condenser 103, it is understood whether or not the exhaust gas is able to be sufficiently cooled in the condenser 103 by heat exchange with the external air. The exhaust gas cooling capability in the condenser 103 is therefore able to be determined.

It should be noted that a possible example of the temperature detector 108A is a thermocouple, a thermistor, or the like.

The controller 109 implements the aforementioned water recovery mode in the case where the temperature detected by the temperature detector 108A is equal to or less than a prescribed temperature.

FIG. 8 illustrates an example in which the cooling determination device 108 of FIG. 1 is the temperature detector 108A; however, it should be noted that the present disclosure is not restricted thereto. The cooling determination device 108 of FIG. 3 or FIG. 5 may also be the temperature detector 108A.

[Operation]

Figure 9:
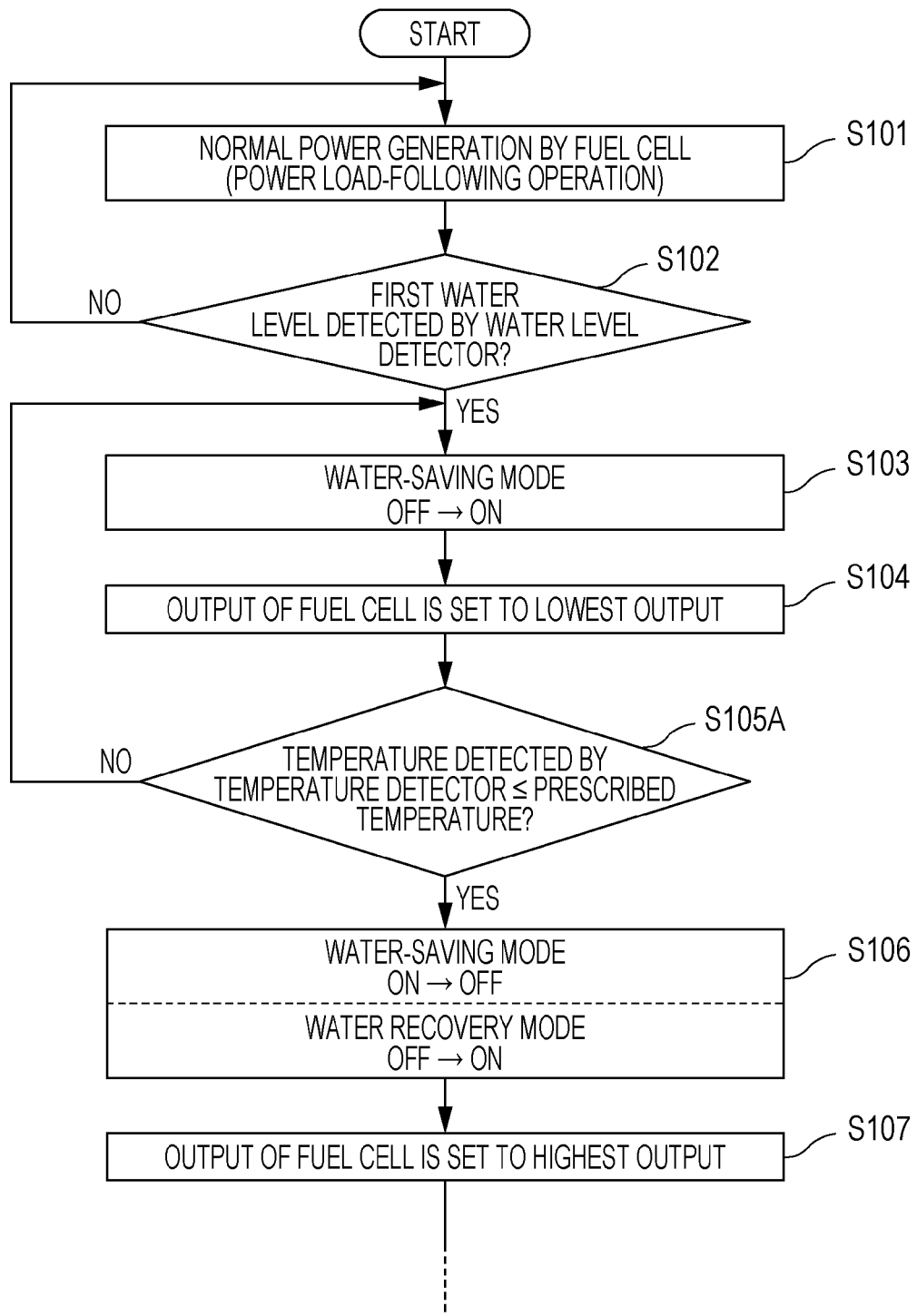
FIG. 9 is a flowchart illustrating an example of the operation of the fuel cell system of the second working example of the first embodiment.

FIG. 9 is a flowchart illustrating an example of the operation of the fuel cell system of the second working example of the first embodiment. It should be noted that the operation described hereinafter is carried out by the control program of the controller 109.

Step S101 to step S104, step S106, and step S107 of FIG. 9 are the same as in the first embodiment and descriptions thereof are therefore omitted.

As illustrated in FIG. 9, it is determined whether or not the temperature detected by the temperature detector 108A is equal to or less than a prescribed temperature (step S105A). In the case where the temperature detected by the temperature detector 108A exceeds the prescribed temperature, it is determined that the cooling capability for exhaust gas in the condenser 103 brought about by the cooling medium is insufficient for condensing the water vapor in the exhaust gas. In this case, the operation of step S104 is continued. However, in the case where the temperature detected by the temperature detector 108A is equal to or less than the prescribed temperature, it is determined that the cooling capability for exhaust gas in the condenser 103 brought about by the cooling medium is sufficient for condensing the water vapor in the exhaust gas. In this case, the controller 109 outputs an instruction for the fuel cell system 100 to switch from the water-saving mode to the water recovery mode, and the water recovery mode of the fuel cell system 100 is carried out. The prescribed temperature of step S105A is set as a reference value for whether or not the cooling capability for exhaust gas in the condenser 103 brought about by the cooling medium is sufficient for condensing the water vapor in the exhaust gas, and is appropriately set according to the arrangement of the temperature detector 108A, the selection of the cooling medium, and so forth.

FIG. 9 illustrates an example in which step S105 of the flow chart of FIG. 2 is altered to the aforementioned step S105A; however, it should be noted that the present disclosure is not restricted thereto. Step S105 of the flow chart of FIG. 4 may be altered to the aforementioned step S105A.

According to the above, in the fuel cell system 100 of the present working example, a condition for implementing the water recovery mode in which condensed water is recovered can be appropriately and easily set using the temperature detector 108A. It is therefore possible for the water self-sustaining operation of the fuel cell system 100 to be continued in an appropriate manner even in the case where there are successive days in which the external air temperature in the summertime and so on is high.

Third Working Example

With regard to the fuel cell system of a third working example of the first embodiment, an information receiving unit that receives information from outside is provided, the cooling determination device is the information receiving unit, and the controller implements the aforementioned water recovery mode in the case where the exhaust gas cooling capability is equal to or greater than a prescribed value on the basis of the information received by the information receiving unit, in the fuel cell system of any of the first embodiment, a modified example of the first embodiment, and the first working example of the first embodiment.

According to this configuration, the implementation of the water recovery mode can be set on the basis of external information. It is possible to predict that the cooling capability will be equal to or greater than a prescribed value capability according to the way in which the external information is used and to reduce the amount of condensed water that is consumed by shortening a water-saving mode period, and it is possible for the water self-sustaining operation of the fuel cell system to be continued in an appropriate manner even in the case where there are successive days in which the external air temperature in the summertime and so on is high.

The power generation system of the present working example may be configured in the same way as the fuel cell system of any of the first embodiment, a modified example of the first embodiment, or the first working example of the first embodiment, except for the aforementioned feature.

[Device Configuration]

Figure 10:
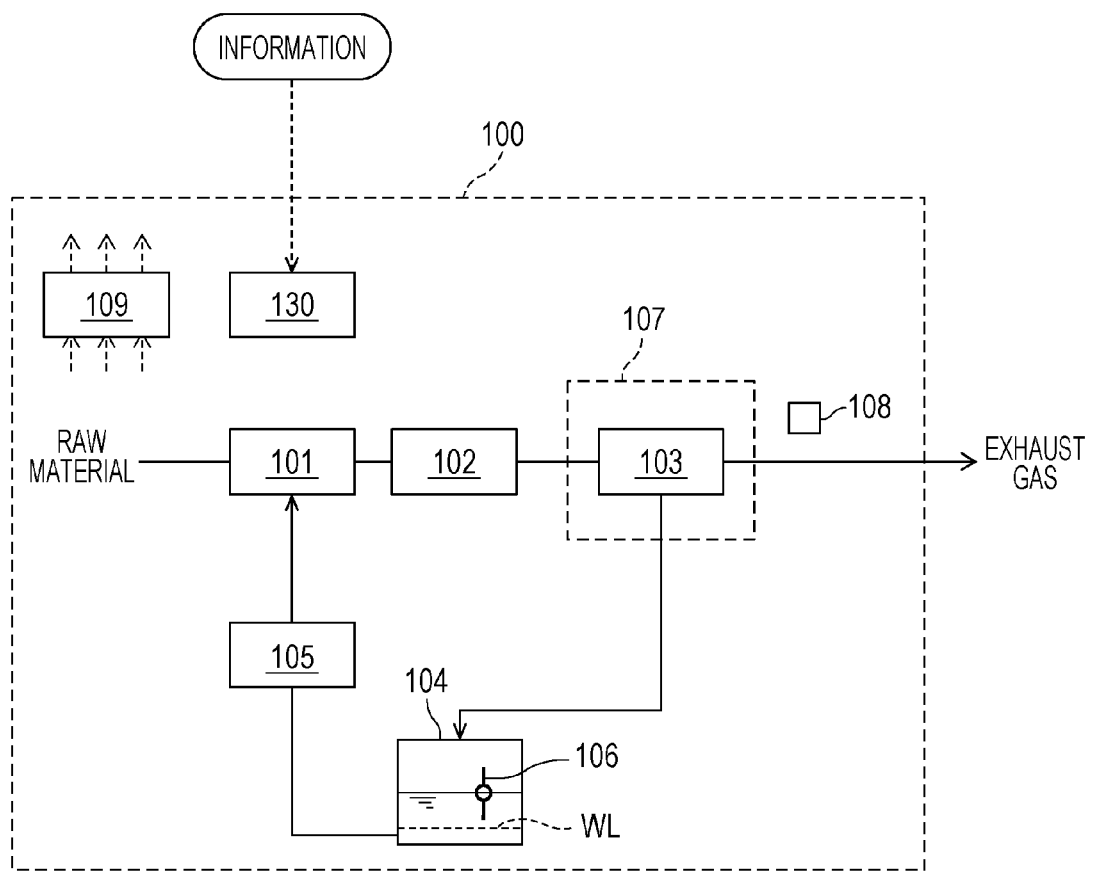
FIG. 10 is a drawing illustrating an example of a fuel cell system of a third working example of the first embodiment.

FIG. 10 is a drawing illustrating an example of a fuel cell system of the third working example of the first embodiment.

As illustrated in FIG. 10, the fuel cell system 100 is provided with the reformer 101, the fuel cell 102, the condenser 103, the condensed water tank 104, the reforming water supplier 105, the water level detector 106, the exhaust gas cooler 107, the cooling determination device 108, the controller 109, and an information receiving unit 130.

The reformer 101, the fuel cell 102, the condenser 103, the condensed water tank 104, the reforming water supplier 105, the water level detector 106A, the exhaust gas cooler 107, and the cooling determination device 108 are the same as in the first embodiment and descriptions thereof are therefore omitted.

The information receiving unit 130 is exemplified in the third working example of the first embodiment.

The information receiving unit 130 receives information on the external temperature or the like by wireless or wired communication from a device independently installed separate from the fuel cell system, and may be a wireless receiver provided with a microcomputer that receives the external temperature via a home energy management system (HEMS), for example.

By having the information receiving unit 130, it is possible to switch to an operation with which external temperature changes are predicted from cloud data, for example.

[Operation]

Figure 11:
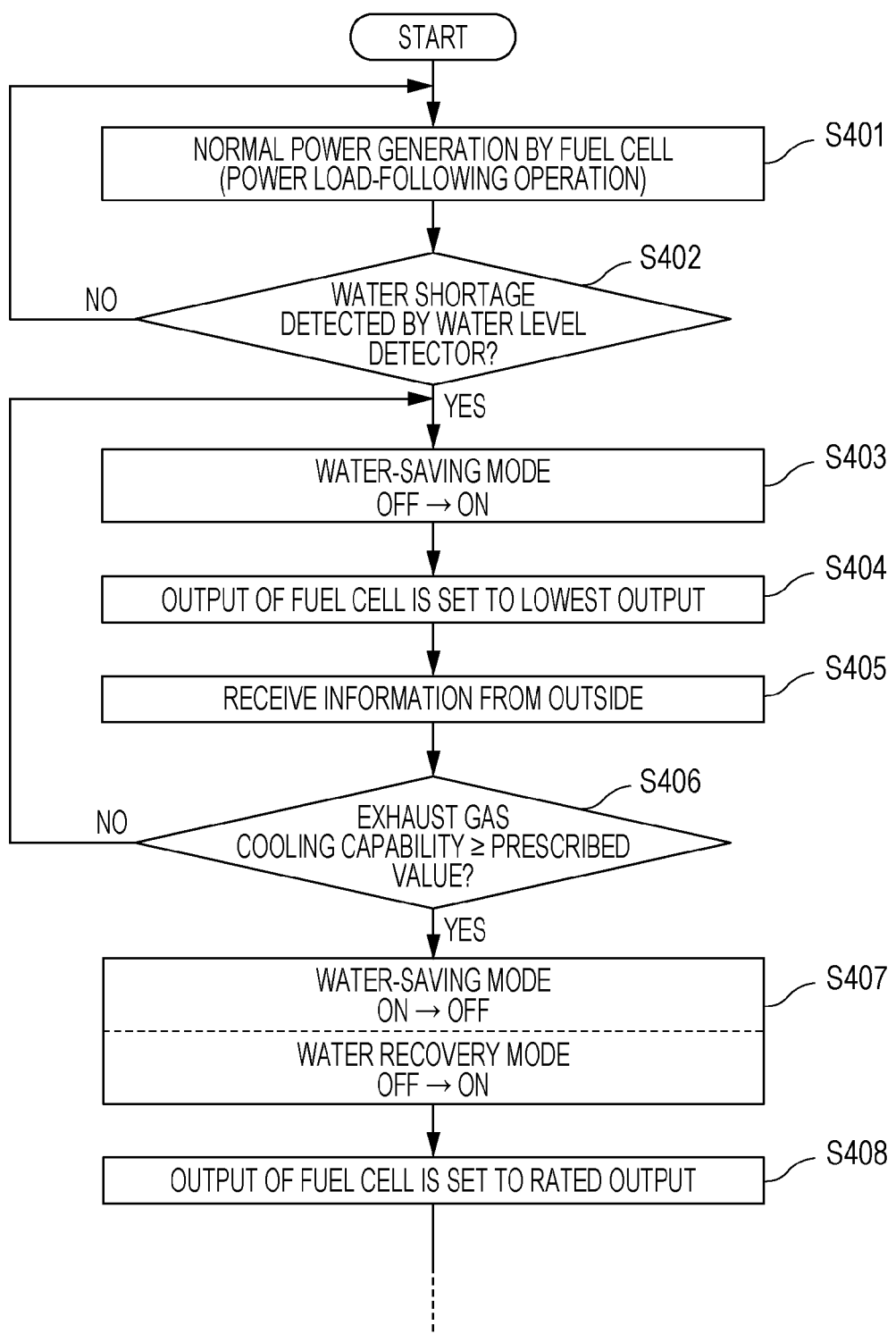
FIG. 11 is a flowchart illustrating an example of the operation of the fuel cell system of the third working example of the first embodiment.

FIG. 11 is a flowchart illustrating an example of the operation of the fuel cell system of the third working example of the first embodiment. It should be noted that the operation described hereinafter is carried out by the control program of the controller 109.

Step S401 to step S404 of FIG. 11 are the same as in the first embodiment and descriptions thereof are therefore omitted.

As illustrated in FIG. 11, information (prediction information or the like) from outside is received in step S405.

Whether the exhaust gas cooling capability is equal to or greater than a prescribed value is determined in step S406 on the basis of the received information.

The subsequent step S406 to step S408 correspond to step S105 to step S107 of the first embodiment and descriptions thereof are therefore omitted.

Second Embodiment

With regard to the fuel cell system according to a second embodiment, a water storage tank, a cold water path that connects a circulation water outlet of the water storage tank and the condenser, a hot water path that connects the condenser and a circulation water inlet of the water storage tank, a water circulator that circulates water of the water storage tank, and a circulation water cooler that is arranged on the cold water path and cools the circulation water are provided as the exhaust gas cooler, a hot water amount detector that detects the amount of hot water in the water storage tank and a water temperature detector that detects the temperature of the circulation water that flows through the cold water path downstream from the circulation water cooler are provided as the cooling determination device, and the controller implements the water recovery mode in the case where the amount of hot water detected by the hot water amount detector is equal to or less than a prescribed amount, or in the case where the temperature detected by the water temperature detector is equal to or less than a prescribed temperature, in the fuel cell system of the first embodiment or modified example 1 of the first embodiment.

According to this configuration, it is possible for a fuel cell system to operate continuously in an appropriate manner compared to the past in the case where the water self-sustaining operation of the fuel cell system is difficult due to environmental conditions, operating conditions, and the like. To be specific, compared to the case where external air is used for a cooling medium that cools exhaust gas, switching to the water recovery mode can be carried out even in conditions in which the external temperature is high by using water in a water storage tank as a cooling medium. For example, switching to the water recovery mode is able to be carried out in an appropriate manner in the case where hot water in the water storage tank has been consumed due to demand for the supply of hot water and an appropriate amount of cold water supplemented from outside is in the water storage tank. Furthermore, as a result of implementing the water recovery mode by using cold water for the cooling medium, the amount of water in the condensed water tank is able to be supplemented even more quickly. It is therefore possible for the water self-sustaining operation of the fuel cell system to be continued in an appropriate manner even in the case where there are successive days in which the external air temperature in the summertime and so on is high, for example.

The power generation system of the present embodiment may be configured in the same way as the fuel cell system of the first embodiment or modified example 1 of the first embodiment, except for the aforementioned feature.

[Device Configuration]

Figure 12:
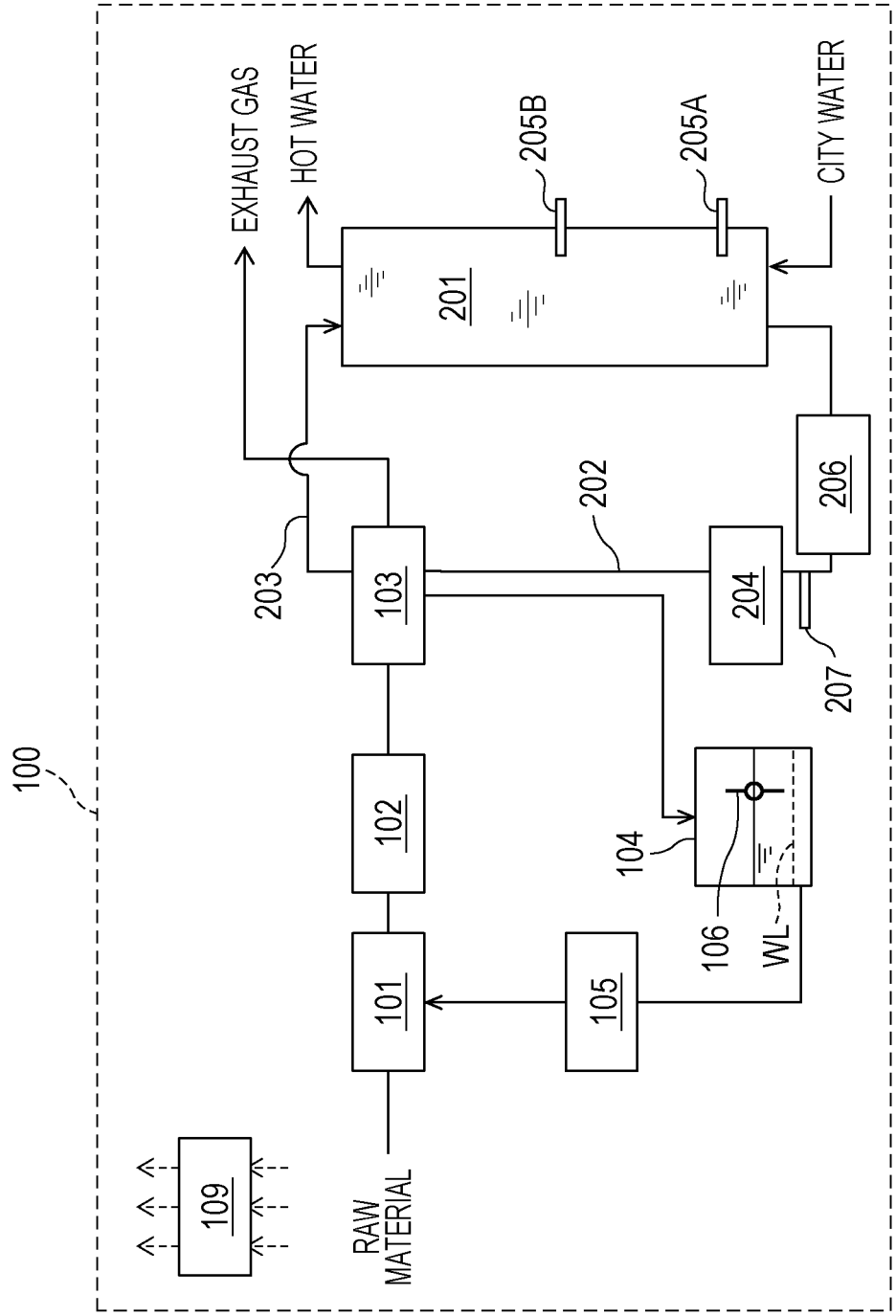
FIG. 12 is a drawing illustrating an example of a fuel cell system of a second embodiment.

FIG. 12 is a drawing illustrating an example of the fuel cell system of the second embodiment.

As illustrated in FIG. 12, the fuel cell system 100 is provided with the reformer 101, the fuel cell 102, the condenser 103, the condensed water tank 104, the reforming water supplier 105, the water level detector 106, the controller 109, a water storage tank 201, a cold water path 202, a hot water path 203, a water circulator 204, a first hot water amount detector, a second hot water amount detector, a circulation water cooler 206, and a water temperature detector 207.

Furthermore, the fuel cell system 100 is provided with the water storage tank 201, the cold water path 202, the hot water path 203, the water circulator 204, and the circulation water cooler 206 as an exhaust gas cooler that supplies, to the condenser 103, a cooling medium that cools exhaust gas. Furthermore, the first hot water amount detector, the second hot water amount detector, and the water temperature detector 207 are provided as a cooling determination device used to determine the exhaust gas cooling capability in the condenser 103 brought about by the cooling medium.

The reformer 101, the fuel cell 102, the condenser 103, the condensed water tank 104, the reforming water supplier 105, and the water level detector 106 are the same as in the first embodiment and descriptions thereof are therefore omitted.

The water storage tank 201 stores water. In the present embodiment, the heat of exhaust gas is recovered in the condenser 103 and hot water that has passed through the condenser 103 is stored in the water storage tank 201. The water storage tank 201 may have any kind of configuration as long as it is able to store hot water such as this. A possible example of the water storage tank 201 is a layered hot water storage tank that is made of metal (made of SUS) formed in a columnar shape, in which hot water is taken from an upper section of the water storage tank 201, resulting in the tank internal temperature having a layered distribution. In this case, the hot water stored in the upper section of the water storage tank 201 is discharged in accordance with demand for the supply of hot water. Cold water such as city water is supplied from a lower section of the water storage tank 201 in an amount proportionate to the amount of hot water that is discharged.

The cold water path 202 is a flow path that connects a circulation water outlet of the water storage tank 201 and the condenser 103. For example, a pipe constituting the cold water path 202 may extend so as to lead from the circulation water outlet of the water storage tank 201 to the condenser 103. Cold water from the water storage tank 201 is thereby supplied through this pipe to the condenser 103, and this cold water can be used for a cooling medium that is a heat-receiving fluid for the condenser 103.

The hot water path 203 is a flow path that connects the condenser 103 and a circulation water inlet of the water storage tank 201. For example, a pipe constituting the hot water path 203 may extend so as to lead from the condenser 103 to the circulation water inlet of the water storage tank 201. Hot water from the condenser 103 is thereby supplied through this pipe to the upper section of the water storage tank 201, and this hot water can be stored in the water storage tank 201 as hot water for hot water supply.

The water circulator 204 circulates the water of the water storage tank 201. The water circulator 204 may have any kind of configuration as long as it is able to circulate the water of the water storage tank 201. For example, the water circulator 204 is arranged on the cold water path 202 and is thereby able to cause the water in the water storage tank 201 to circulate in such a way as to pass through the cold water path 202 and the hot water path 203 and to once more return to the water storage tank 201. A possible example of the water circulator 204 is a pump or the like, and a possible example of a pump is a rotating circulation pump or the like.

The circulation water cooler 206 is arranged on the cold water path 202 and cools circulation water. The circulation water cooler 206 may have any kind of configuration as long as it is able to cool circulation water. A possible example of the circulation water cooler 206 is a radiator or the like, and a possible example of a radiator is an item provided with an air-cooled radiator and a radiator fan, or the like.

The hot water amount detectors detect the amount of hot water in the water storage tank 201. In the present embodiment, the first hot water amount detector and the second hot water amount detector are each provided in appropriate locations in the water storage tank 201. The first hot water amount detector and the second hot water amount detector may have any kind of configuration as long as they are able to directly or indirectly detect the amount of hot water in the water storage tank 201. A possible example of the first hot water amount detector and the second hot water amount detector is a temperature detector or the like that is provided on the outer surface of the water storage tank 201 and is able to detect the temperature of water in the water storage tank 201. Furthermore, a possible example of this detector is a thermocouple, a thermistor, or the like.

Thus, the first hot water amount detector may be a first temperature detector 205A that is used to determine whether or not the entirety of the water storage tank 201 is filled with hot water. For example, this first temperature detector 205A may be arranged near the lower end section of the water storage tank 201, this section being at the lower end in the vertical direction in which the gravity acts. Then, in the case where the temperature detected by the first temperature detector 205A is equal to or greater than a prescribed temperature (70° C., for example), it is determined that hot water of an amount corresponding to the internal volume of the water storage tank 201 is present in the water storage tank 201. In other words, it is determined that the entirety of the water storage tank 201 is filled with hot water.

Furthermore, the second hot water amount detector may be a second temperature detector 205B for indicating the position of the boundary between the hot water and the cold water inside the water storage tank 201. The position of the boundary between the hot water and the cold water inside the water storage tank 201 can be indirectly detected by this second temperature detector 205B, and therefore the second temperature detector 205B can be used to determine the feasibility of switching from the water-saving mode to the water recovery mode. For example, the second temperature detector 205B is arranged near the central section of the water storage tank 201 in the vertical direction (at a position corresponding to approximately half of the internal volume of the water storage tank 201). Thus, in the case where the temperature detected by the second temperature detector 205B is equal to or less than a prescribed temperature (35° C., for example), it can be determined that hot water of approximately 50% or less of the internal volume of the water storage tank 201 and cold water of approximately 50% or more of this internal volume are present in the water storage tank 201, and it can be determined that it is possible to switch to the water recovery mode. In other words, the arrangement position of the second temperature detector 205B is appropriately set on the basis of the configuration of the fuel cell system 100. For example, the arrangement position of the second temperature detector 205B may be set on the basis of the internal volumes of the pipe constituting the cold water path 202 and the pipe constituting the hot water path 203, and so forth.

The water temperature detector 207 detects the temperature of circulation water that flows through the cold water path 202 downstream from the circulation water cooler 206. The water temperature detector 207 may have any kind of configuration as long as it is able to directly or indirectly detect the temperature of circulation water that flows through the cold water path 202 downstream from the circulation water cooler 206. For example, the temperature of the circulation water may be directly detected with the water temperature detector 207 being provided in the cold water path 202, or the temperature of the circulation water may be indirectly detected with the water temperature detector 207 being provided in a prescribed location that correlates with the temperature of the circulation water (for example, the surface or the like of the pipe constituting the cold water path 202). A possible example of the water temperature detector 207 is a thermocouple, a thermistor, or the like.

In the case where hot water is flowing through the cold water path 202 in a state in which the water storage tank 201 is filled with hot water, the water temperature detector 207 can be used to determine the cooling capability for the circulation water in the circulation water cooler 206 brought about by air-cooling. The water temperature detector 207 can therefore be used to determine the feasibility of switching from the water-saving mode to the water recovery mode. For example, in the case where it is determined using the aforementioned first temperature detector 205A that the entirety of the water storage tank 201 is filled with hot water, switching can be carried out to the water recovery mode if the cooling capability for circulation water in the circulation water cooler 206 brought about by air-cooling is sufficient for condensing the water vapor in the exhaust gas in the condenser 103. Thus, it can be determined that it is possible to switch to the water recovery mode in the case where the temperature detected by the water temperature detector 207 is equal to or less than a prescribed temperature (30° C., for example).

According to the above, the controller 109 implements the aforementioned water recovery mode in the case where the amount of hot water detected by a hot water amount detector is equal to or less than a prescribed amount, or in the case where the temperature detected by the water temperature detector 207 is equal to or less than a prescribed temperature.

An example has been described in which, in FIG. 12, the exhaust gas cooler 107 and the cooling determination device 108 of the fuel cell system 100 of FIG. 1 are configured using the aforementioned devices; however, it should be noted that the present disclosure is not restricted thereto. The exhaust gas cooler 107 and the cooling determination device 108 of the fuel cell system 100 of FIG. 3 may also be configured using the aforementioned devices.

[Operation]

Figure 13:
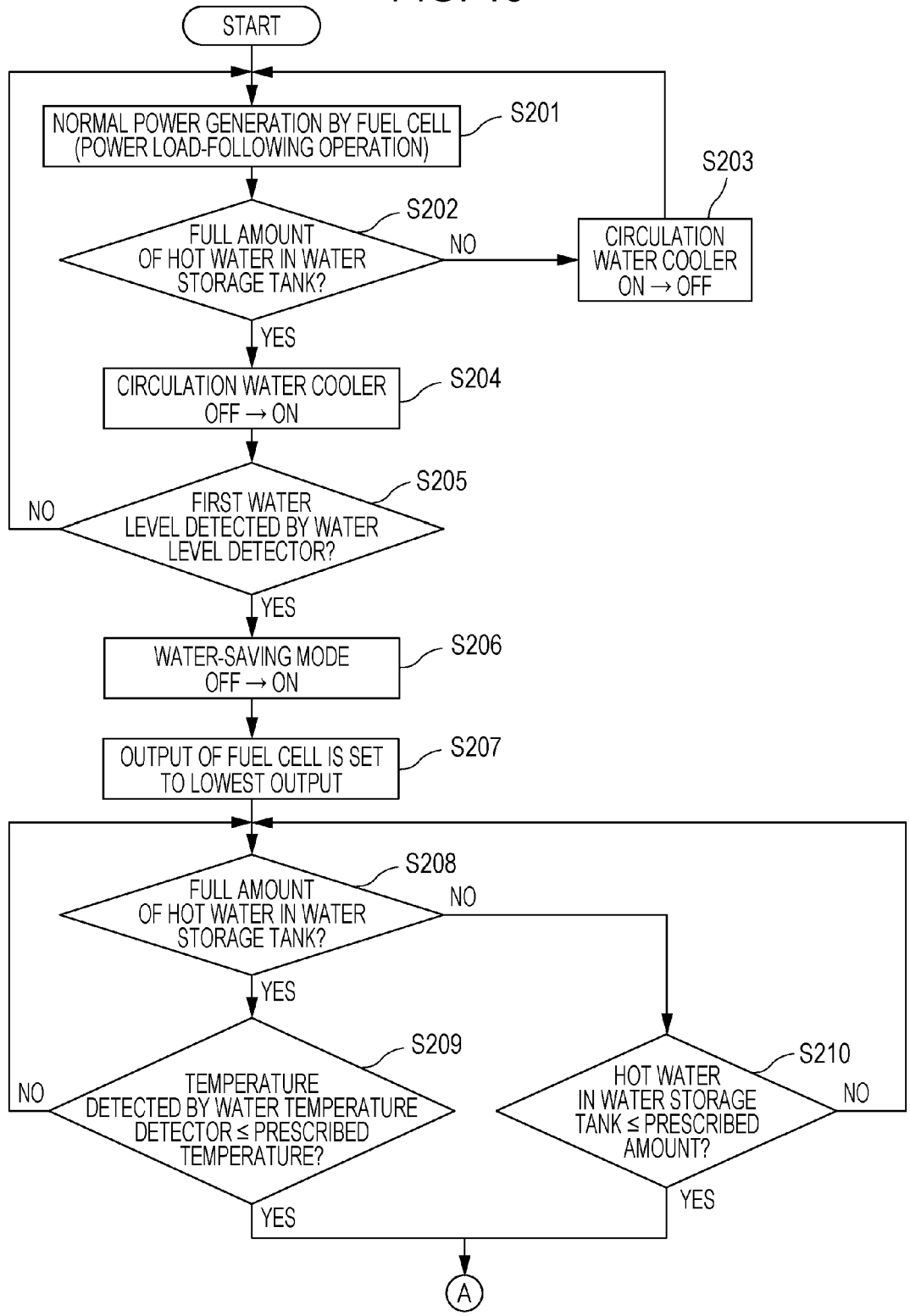
FIG. 13 is a flowchart illustrating an example of the operation of the fuel cell system of the second embodiment.
Figure 14:
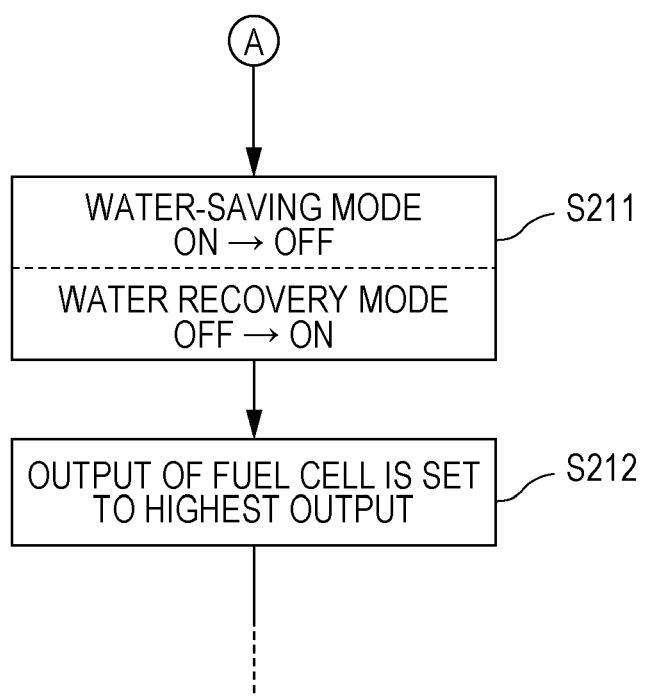
FIG. 14 is a flowchart illustrating an example of the operation of the fuel cell system of the second embodiment.

FIG. 13 and FIG. 14 are flowcharts illustrating an example of the operation of the fuel cell system of the second embodiment. It should be noted that the operation described hereinafter is carried out by the control program of the controller 109.

During normal operation, the fuel cell system 100 operates while altering the output in accordance with an external power load (the power demand of a household, for example) (step S201). It should be noted that, in step S201, both the water-saving mode and the water recovery mode described hereinafter are in an OFF state.

At such time, it is determined using the first hot water amount detector whether or not there is a full amount of hot water in the water storage tank 201 (step S202). For example, it may be determined that there is a full amount of hot water in the water storage tank 201 in the case where the temperature detected by the first temperature detector 205A constituting an example of the first hot water amount detector is equal to or greater than a prescribed temperature (70° C., for example). It should be noted that the prescribed temperature of step S202 is exemplary and the present disclosure is not restricted to this example.

In the case where there is not a full amount of hot water in the water storage tank 201, cold water is present in the water storage tank 201 and therefore the normal operation of the fuel cell system 100 is continued. In other words, in this case, the operation of the circulation water cooler 206 is switched from ON to OFF (step S203) and the operation of step S201 is continued. It should be noted that the reason for setting the operation of the circulation water cooler 206 to OFF in step S203 is because the operation of the circulation water cooler 206 remains in an ON state after step S204 and it is therefore necessary to ensure a step in which an operation to set the circulation water cooler 206 to OFF is carried out.

However, in the case where there is a full amount of hot water in the water storage tank 201, in this state, there is a high possibility of exhaust gas cooling not being able to be carried out in the condenser 103. Furthermore, there is a high possibility of the water temperature of the circulation water also rising excessively.

Thus, the operation proceeds to the next step S204 and the operation of the circulation water cooler 206 is switched from OFF to ON. For example, in the case where the circulation water cooler 206 is a cooler provided with an air-cooled radiator and a radiator fan, the rotation of the radiator fan may be set to ON.

Next, in this state, it is determined whether or not the first water level WL corresponding to a shortage of water in the condensed water tank 104 has been detected using the water level detector 106 (step S205). In the case where the first water level WL is not detected, the operation returns to step S201 and the operation of step S201 and thereafter is continued. However, in the case where the first water level WL is detected, the operation proceeds to the next step S206.

In step S206, the water-saving mode flag is set to ON. In other words, because a shortage of water in the condensed water tank 104 is detected in step S205, the controller 109 issues an instruction for the fuel cell system 100 to switch from the normal operation to the water-saving mode.

Next, when the instruction to switch to the water-saving mode is output, the output of the fuel cell 102 is decreased regardless of the external power load and the amount of reforming water used is reduced. In the present example, the output of the fuel cell 102 is set to the lowest regardless of the external power load (step S207). In other words, the reforming water supplier 105, the raw material supplier, and the like are controlled in such a way that the output of the fuel cell 102 becomes the lowest output. For example, as the lowest output of the fuel cell 102, the fuel cell system 100 may be controlled in such a way that power is not supplied to outside and the output power required only for the operation of the fuel cell system 100 is provided.

Next, a description will be given regarding a step for determining switching from the water-saving mode to the water recovery mode in the operation of the fuel cell system 100 of the present embodiment.

First, it is once again determined using the first hot water amount detector whether or not there is a full amount of hot water in the water storage tank 201 (step S208).

In the case where there is a full amount of hot water in the water storage tank 201, in this state, there is a high possibility of exhaust gas cooling not being able to be carried out in the condenser 103. Furthermore, there is a high possibility of the water temperature of the circulation water also rising excessively. Thus, the operation proceeds to the next step S209 and it is determined whether or not the temperature detected by the water temperature detector 207 is equal to or less than a prescribed temperature. For example, in the case where the temperature detected by the water temperature detector 207 is equal to or less than a prescribed temperature (30° C., for example), it is determined that it is possible to switch from the water-saving mode to the water recovery mode, and the operation proceeds to the next step S211. However, in the case where the temperature detected by the water temperature detector 207 exceeds the prescribed temperature (30° C., for example), the operation returns to step S208 and the operation of step S208 and thereafter is continued. It should be noted that the prescribed temperature of step S209 is exemplary and the present disclosure is not restricted to this example.

Furthermore, in the case where there is not a full amount of hot water in the water storage tank 201 in step S208, the operation proceeds to step S210 and it is determined using the second hot water amount detector whether or not the amount of hot water in the water storage tank 201 is equal to or less than a prescribed amount. For example, in the case where the temperature detected by the second temperature detector 205B constituting an example of the second hot water amount detector is equal to or less than a prescribed temperature (35° C., for example), it can be determined that hot water of approximately 50% or less of the internal volume of the water storage tank 201 and cold water of approximately 50% or more of this internal volume are present in the water storage tank 201. Thus, it is determined that it is possible to switch to the water recovery mode. In other words, in the case where the amount of hot water in the water storage tank 201 is equal to or less than the prescribed amount, the operation proceeds to the next step S211. However, in the case where the amount of hot water in the water storage tank 201 exceeds the prescribed amount, in this state, there is a high possibility of exhaust gas cooling not being able to be carried out in the condenser 103. Furthermore, there is a high possibility of the water temperature of the circulation water also rising excessively. Thus, the operation returns to step S208 and the operation of step S208 and thereafter is continued. It should be noted that the prescribed temperature of step S210 is exemplary and the present disclosure is not restricted to this example.

In step S211, the water recovery mode flag is set to ON. At the same time, the water-saving mode flag is set to OFF since the water-saving mode is not necessary. In other words, in step S208 to step S210, since it is determined that the cooling capability for exhaust gas in the condenser 103 brought about by the circulation water is sufficient for condensing the water vapor in the exhaust gas, the controller 109 outputs an instruction for the fuel cell system 100 to switch from the water-saving mode to the water recovery mode.

Next, when the instruction for switching to the water recovery mode is output, the output of the fuel cell 102 is increased regardless of the external power load and the amount of condensed water recovered is increased. In the present example, the output of the fuel cell 102 is set to the highest regardless of the external power load (step S212). In other words, the reforming water supplier 105, the raw material supplier, and the like are controlled in such a way that the output of the fuel cell 102 becomes the highest output.

Although not depicted, it should be noted that steps that are the same as step S108 and step S109 of FIG. 4 may be added after step S212 and, thereafter, the operation may return to step S201.

According to the above, in the present embodiment, it is possible for the fuel cell system 100 to operate continuously in an appropriate manner compared to the past in the case where the water self-sustaining operation of the fuel cell system 100 is difficult due to environmental conditions, operating conditions, and the like. To be specific, compared to the case where external air is used for a cooling medium that cools exhaust gas, switching to the water recovery mode can be carried out even in conditions in which the external temperature is high by using the water in the water storage tank 201 as a cooling medium. For example, switching to the water recovery mode is able to be carried out in an appropriate manner in the case where the hot water in the water storage tank 201 has been consumed due to demand for the supply of hot water and an appropriate amount of cold water supplemented from outside is in the water storage tank 201. Furthermore, as a result of implementing the water recovery mode by using cold water for the cooling medium, the amount of water in the condensed water tank 104 is able to be supplemented even more quickly. It is therefore possible for the water self-sustaining operation of the fuel cell system 100 to be continued in an appropriate manner even in the case where there are successive days in which the external air temperature in the summertime and so on is high, for example.

A fuel cell system of an aspect of the present disclosure is able to operate continuously in an appropriate manner compared to the past in the case where the water self-sustaining operation of the fuel cell system is difficult due to environmental conditions, operating conditions, and the like. Thus, an aspect of the present disclosure is able to be used in a fuel cell system, for example.

What is claimed is:

1. A fuel cell system comprising:
a reformer configured to produce fuel from a raw material and reforming water;
a fuel cell configured to use the fuel from the reformer to generate power;
a condenser configured to cool exhaust gas from the fuel cell and condense water vapor in the exhaust gas;
a condensed water tank configured to recover condensed water produced by the condenser;
a reforming water supplier configured to supply the condensed water in the condensed water tank to the reformer as the reforming water;
a water level detector configured to detect a water level of the condensed water in the condensed water tank;
an exhaust gas cooler configured to supply, to the condenser, a cooling medium that cools the exhaust gas;
a cooling determiner configured to determine an exhaust gas cooling capability in the condenser brought about by the cooling medium; and
a controller configured to, when the water level detector detects a first water level corresponding to a shortage of water in the condensed water tank, implement a water-saving mode in which an output of the fuel cell is decreased regardless of an external power load and an amount of the reforming water used is reduced, and
when the cooling determiner determines during the water-saving mode that the exhaust gas cooling capability is equal to or greater than a prescribed value, the controller is configured to implement a water recovery mode in which the output of the fuel cell is increased regardless of the external power load and an amount of the condensed water recovered is increased.

2. The fuel cell system according to claim 1, wherein
the controller is further configured to stop the water recovery mode when a second water level corresponding to a full water state of the condensed water tank is detected using the water level detector during the water recovery mode.

3. The fuel cell system according to claim 1, wherein
the cooling medium is external air and the exhaust gas cooler is provided with a blower configured to send the external air to the condenser.

4. The fuel cell system according to claim 1, wherein
the cooling determiner is a temperature detector configured to detect either one or both of a temperature of external air that is sent to the condenser and a temperature of the exhaust gas that has passed through the condenser, and
the controller is further configured to implement the water recovery mode when a temperature detected by the temperature detector is equal to or less than a prescribed temperature.

5. The fuel cell system according to claim 1, wherein
the cooling determiner is an information receiver configured to receive information from outside the fuel cell system, and the water recovery mode is implemented based on the information received by the information receiver.

6. The fuel cell system according to claim 1, wherein
a water storage tank, a cold water path that connects a circulation water outlet of the water storage tank and the condenser, a hot water path that connects the condenser and a circulation water inlet of the water storage tank, a water circulator configured to circulate water of the water storage tank, and a circulation water cooler that is arranged on the cold water path and is configured to cool the circulation water, are provided as the exhaust gas cooler,
a hot water amount detector configured to detect an amount of hot water in the water storage tank and a water temperature detector configured to detect a temperature of the circulation water that flows through the cold water path, which is downstream from the circulation water cooler, are provided as the cooling determiner, and the controller is configured to implement the water recovery mode when the amount of hot water detected by the hot water amount detector is equal to or less than a prescribed amount, or when the temperature detected by the water temperature detector is equal to or less than a prescribed temperature.

7. The fuel cell system according to claim 1, wherein power is generated at maximum output in the water recovery mode.

8. The fuel cell system according to claim 1, further comprising:

a displayer configured to notify an operation state of the fuel cell system, the displayer being configured to display that normal power generation, the water-saving mode, or the water recovery mode is being carried out.

* * * * *